US012752348B2

(12) United States Patent
Ono et al.

(10) Patent No.: US 12,752,348 B2
(45) Date of Patent: Oct. 6, 2026

(54) TOOL DRIVING DEVICE AND METHOD OF PRODUCING MACHINED PRODUCT

(71) Applicant: SUBARU CORPORATION, Tokyo (JP)

(72) Inventors: Ryohei Ono, Tokyo (JP); Masao Watanabe, Tokyo (JP); Tatsuo Nakahata, Tokyo (JP); Shinya Matsuo, Tokyo (JP)

(73) Assignee: Subaru Corporation, Tokyo (JP)

( * ) Notice: Subject to any disclaimer, the term of this patent is extended or adjusted under 35 U.S.C. 154(b) by 559 days.

(21) Appl. No.: 18/231,577

(22) Filed: Aug. 8, 2023

(65) Prior Publication Data

US 2024/0075537 A1 Mar. 7, 2024

(30) Foreign Application Priority Data

Sep. 2, 2022 (JP) ................................ 2022-139739

(51) Int. Cl.
*B23B 39/10* (2006.01)
*B23B 35/00* (2006.01)

(52) U.S. Cl.
CPC .............. *B23B 39/10* (2013.01); *B23B 35/00* (2013.01)

(58) Field of Classification Search
CPC ......... B23B 39/10; B23B 35/00; B23B 45/02; B23B 45/008; B23C 1/20
See application file for complete search history.

(56) References Cited

U.S. PATENT DOCUMENTS 3,357,275 A 12/1967 Green, Jr. et al.
3,583,822 A * 6/1971 Alexander .............. B23B 45/04 408/11
4,473,329 A 9/1984 Aoshima et al.
4,688,970 A * 8/1987 Eckman ............ G05B 19/4163 408/137
6,609,441 B1 8/2003 Sugimoto et al.
6,665,948 B1 * 12/2003 Kozin .................... A61B 90/06 175/45
(Continued)

FOREIGN PATENT DOCUMENTS

DE 2923222 A1 12/1980
EP 1430979 A1 6/2004
(Continued)

OTHER PUBLICATIONS

Partial European Search Report, dated Feb. 9, 2024 in European Application No. 23190314.7 (In English).
(Continued)

*Primary Examiner* — Sarang Afzali
*Assistant Examiner* — Darrell C Ford
(74) *Attorney, Agent, or Firm* — McGinn IP Law Group, PLLC

(57) ABSTRACT

A tool driving device for cutting includes a spindle and an electric motor. A user carries the tool driving device by hand to use the tool driving device. The spindle has a holder for holding a tool for the cutting. The holder is disposed at a distal portion of the spindle. The electric motor rotates the spindle. A thrust bearing is attached to a housing of the electric motor. The spindle is contacted to the thrust bearing so that cutting resistance in a rotation axis direction of the spindle, transmitted from the tool to the spindle, is applied to the thrust bearing.

8 Claims, 10 Drawing Sheets

(56) References Cited

U.S. PATENT DOCUMENTS

| | | | | |
|---|---|---|---|---|
| 7,156,191 | B2 | 1/2007 | Lau | |
| 8,004,132 | B2 | 8/2011 | Fukuoka | |
| 8,696,265 | B2 | 4/2014 | Elsmark et al. | |
| 9,333,563 | B2 | 5/2016 | Uchiuzo et al. | |
| 9,517,513 | B2 | 12/2016 | Saito et al. | |
| 9,555,482 | B2 | 1/2017 | Saito et al. | |
| 9,976,631 | B1 * | 5/2018 | Wittig | F16H 3/54 |
| 10,252,386 | B2 | 4/2019 | Saito et al. | |
| 10,328,543 | B2 | 6/2019 | Morimura | |
| 11,383,338 | B2 | 7/2022 | Watanabe et al. | |
| 11,648,705 | B2 | 5/2023 | Hirasawa et al. | |
| 2011/0255930 | A1 | 10/2011 | Ericksson et al. | |
| 2019/0283230 | A1 * | 9/2019 | Sakakibara | B25B 21/00 |
| 2021/0069885 | A1 * | 3/2021 | Huggenberger | B25F 5/001 |
| 2024/0075537 | A1 | 3/2024 | Ono et al. | |

FOREIGN PATENT DOCUMENTS

| | | | |
|---|---|---|---|
| EP | 2 591 870 | A1 | 5/2013 |
| GB | 895722 | A | 5/1962 |
| GB | 2050213 | A | 1/1981 |
| JP | S53-70466 | A | 6/1978 |
| JP | H03-190612 | A | 8/1991 |
| JP | H05-87653 | A | 4/1993 |
| JP | H06-270016 | A | 9/1994 |
| JP | 2000-711 | A | 1/2000 |
| JP | 2009-284584 | A | 12/2009 |
| JP | 2013-188856 | A | 9/2013 |
| JP | 2014-008586 | A | 1/2014 |
| JP | 2014-039992 | A | 3/2014 |
| JP | 2014-050943 | A | 3/2014 |
| JP | 2018-027585 | A | 2/2018 |
| JP | 2020-151818 | A | 9/2020 |
| JP | 2021-005961 | A | 1/2021 |
| TW | 1704434 | B | 9/2020 |
| WO | 2009/128759 | A1 | 10/2009 |
| WO | 2019/0182046 | A1 | 9/2019 |

OTHER PUBLICATIONS

European Patent Office Action, dated Feb. 5, 2024 in EP Application No. 23189925.3 (in English).

Unknown, "Corelesss brushless DC motor", Coreless brushless DC motor -コアレスモータ 株式会社 (cls-motor.com), Corelessmotor Co., Ltd., downloaded Jul. 15, 2023, 6 pages.

Extended European Search Report, dated Apr. 30, 2024 in European Application No. 23190314.7 (in English).

U.S. Non-Final Office Action dated Apr. 15, 2026 in related U.S. Appl. No. 18/231,548.

Japanese Office Action dated Jun. 11, 2026 in Japanese Patent Application No. 2022-139739 with machine English translation.

* cited by examiner

TOOL DRIVING DEVICE AND METHOD OF PRODUCING MACHINED PRODUCT

CROSS REFERENCES TO RELATED APPLICATIONS

This application is based upon and claims the benefit of priority from Japanese Patent Application No. 2022-139739, filed on Sep. 2, 2022; the entire contents of which are incorporated herein by reference.

FIELD

Implementations described herein relate generally to a tool driving device and a method of producing a machined product.

BACKGROUND

Some of handheld tool driving devices for hole processing using tools, such as drills or reamers, have functions to feed out the tools (for example, refer to Japanese Patent Application Publication JP 2013-188856A, Japanese Patent Application Publication JP 2014-008586A, Japanese Patent Application Publication JP 2014-039992A and Japanese Patent Application Publication JP 2014-050943A). In addition, a handheld tool driving device having two motors so that a rotating speed and a feeding speed of a tool can be controlled independently is also suggested (for example, refer to Japanese Patent Application Publication JP 2020-151818A).

An object of the present invention is to make it possible to set a rotating speed and a feeding speed of a tool more appropriately in a case where a user carries a tool driving device and then performs cutting work, such as drilling.

SUMMARY

In general, according to one implementation, a tool driving device for cutting includes a spindle and an electric motor. A user carries the tool driving device by hand to use the tool driving device. The spindle has a holder for holding a tool for the cutting. The holder is disposed at a distal portion of the spindle. The electric motor rotates the spindle. A thrust bearing is attached to a housing of the electric motor. The spindle is contacted to the thrust bearing so that cutting resistance in a rotation axis direction of the spindle, transmitted from the tool to the spindle, is applied to the thrust bearing.

Further, according to one implementation, a method of producing a machined product includes: producing the machined product by cutting a workpiece using the above-mentioned tool driving device.

DETAILED DESCRIPTION

A tool driving device and a method of producing a machined product according to implementations of the present invention will be described with reference to accompanying drawings.

(Structure and Functions of a Tool Driving Device)

Figure 1:
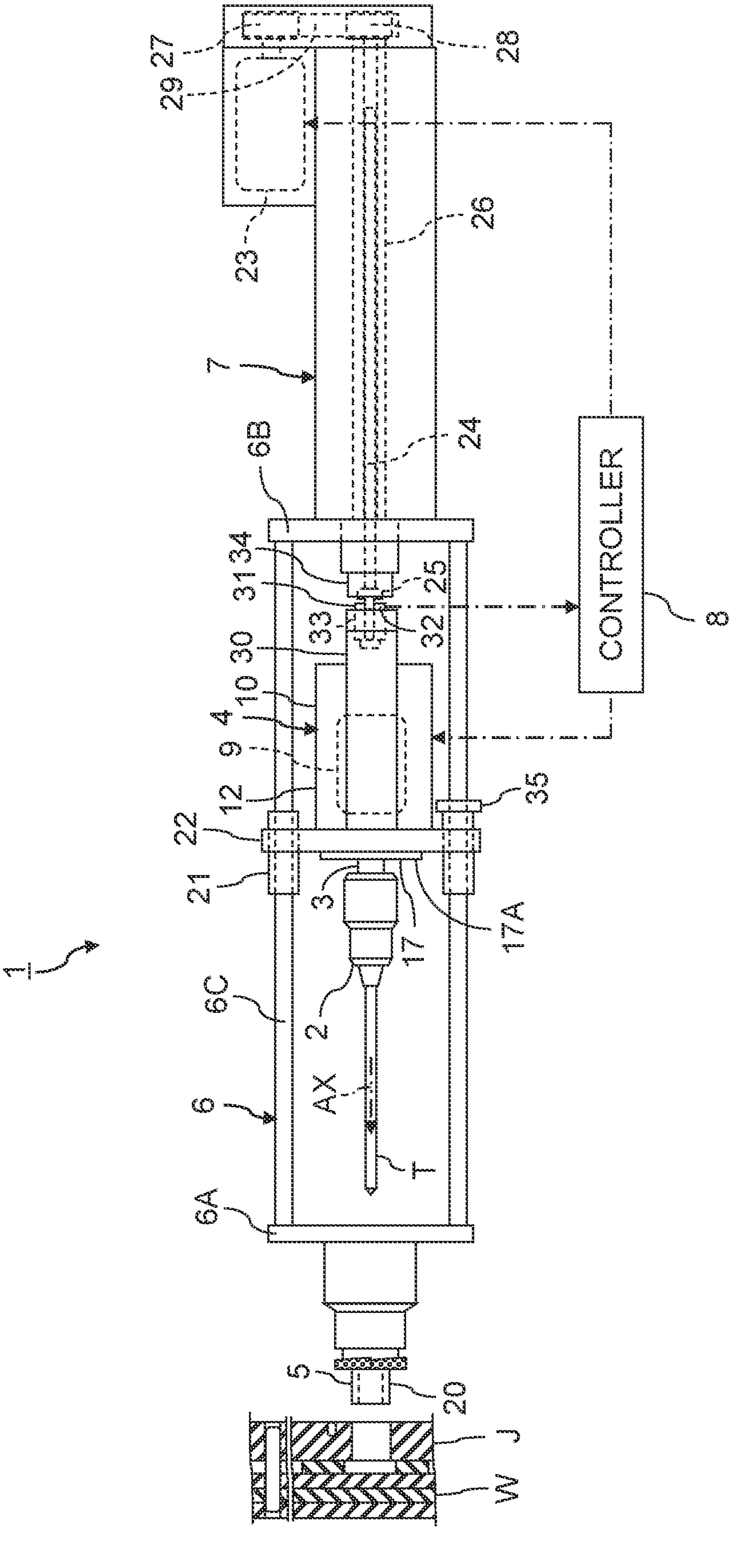
FIG. 1 is a front view of a tool driving device according to an implementation of the present invention.
Figure 2:
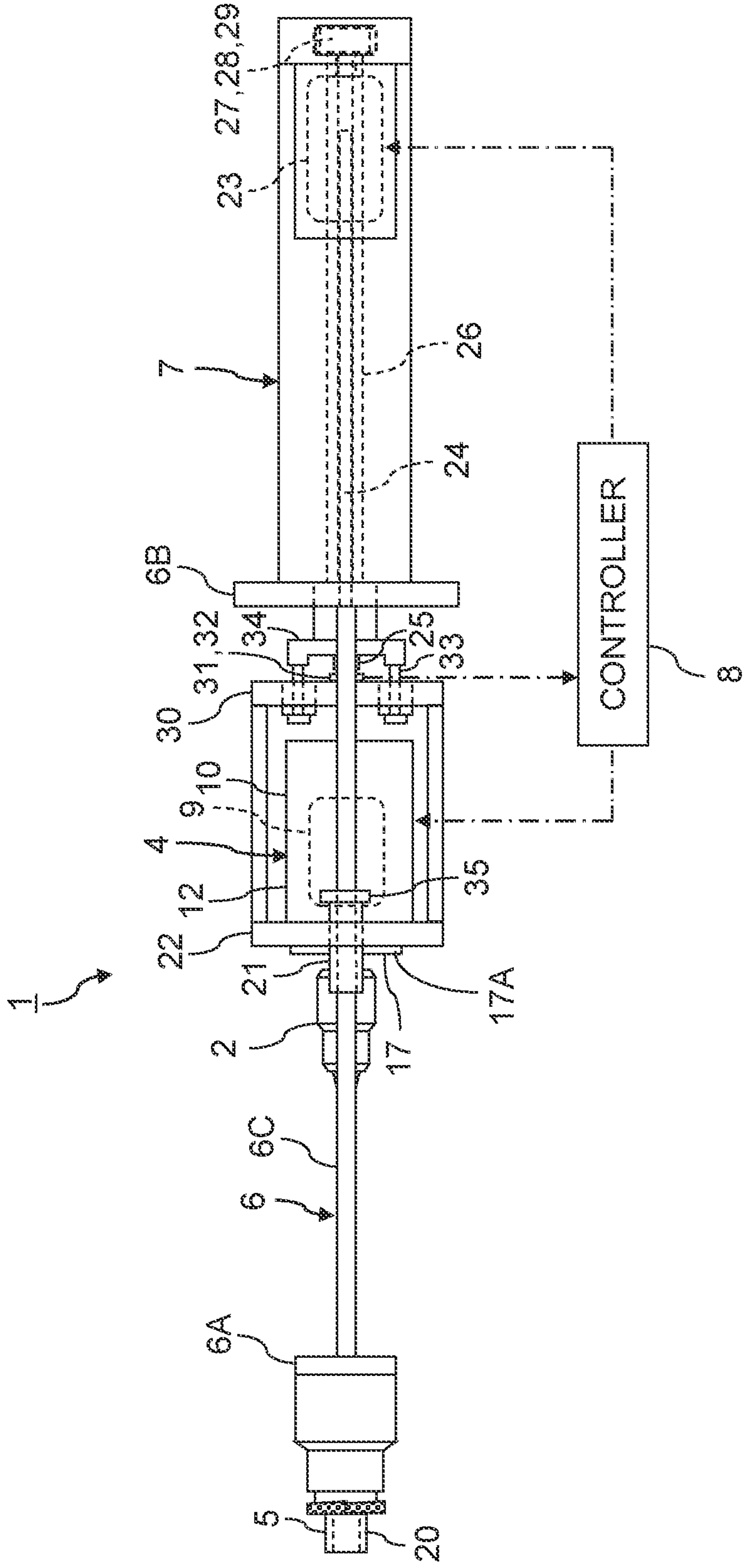
FIG. 2 is a top view of the tool driving device shown in FIG. 1.

FIG. 1 is a front view of a tool driving device according to an implementation of the present invention. FIG. 2 is a top view of the tool driving device shown in FIG. 1.

A tool driving device 1 is used for hole processing. A user can carry the tool driving device 1 by hand, and set up the tool driving device 1 to a workpiece W. Therefore, the tool driving device 1 is downsized and the number of parts is reduced so that the weight of the tool driving device 1 may become not more than 20 kg. The tool driving device 1 has a function to rotate a tool T, such as a drill or a reamer, for hole processing, and a function to feed out the tool T in the tool axis AX direction.

For that purpose, the tool driving device 1 has a holder 2, a spindle 3, a first electric motor 4, a positioning member 5, a guide 6, an electric actuator 7 and a controller 8. The holder 2 is a part for holding the tool T for hole processing. The first electric motor 4 rotates the spindle 3. The guide 6 is a part for feeding out of the tool T. The electric actuator 7 feed out the tool T.

Examples of the holder 2 include a holder to and from which an adapter, such as a collet chuck, for holding the tool T directly is attached and detached to use the holder, and a holder with which an adapter is integrated. The holder 2 having an adapter for holding a drill is also called a drill chuck. The holder 2 is fixed to one end part of the spindle 3 so that the tool axis AX direction, which is the rotation axis direction of the tool T, and the rotation axis direction of the spindle 3 may lie on a same straight line. The spindle 3 is a shaft for transmitting the torque generated by the first electric motor 4 to the holder 2.

Figure 3:
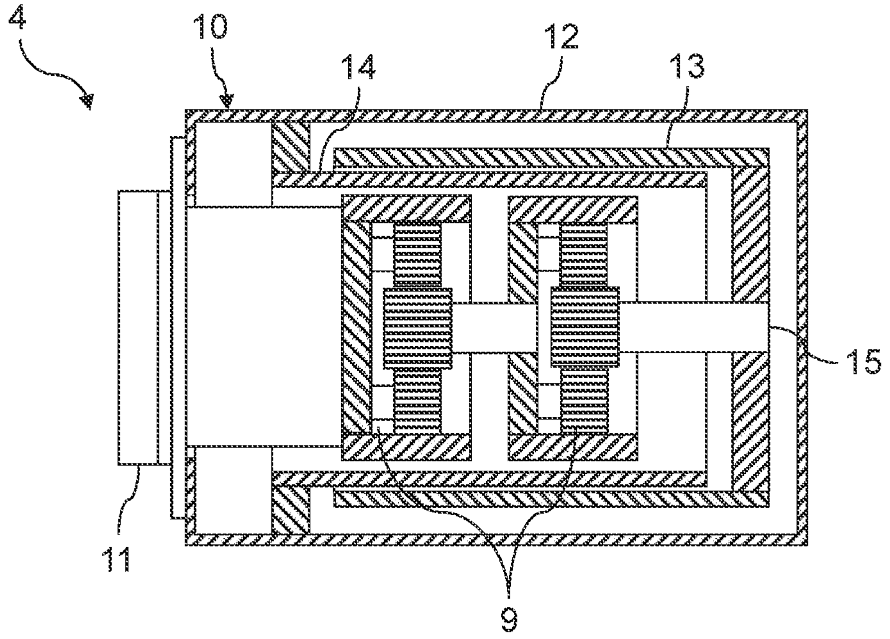
FIG. 3 is a schematic partial longitudinal sectional view of the first electric motor shown in FIG. 1 for explaining an example of the internal structure.

FIG. 3 is a schematic partial longitudinal sectional view of the first electric motor 4 shown in FIG. 1 for explaining an example of the internal structure.

It is realistic to couple gears 9 to the first electric motor 4, which gives torque to the spindle 3, in order to adjust a rotating speed and the torque. That is, it is realistic to couple a speed reducer composed of the gears 9 to the first electric motor 4 so that the rotating speed may be reduced while the torque may be increased.

Accordingly, a coreless motor 10 having an output shaft 11 and a housing 12 inside which the gears 9 are disposed can be used as the first electric motor 4, as an illustrated example. In other words, the gears 9 can be coupled to the first electric motor 4 in the radial direction of the output shaft 11 of the first electric motor 4.

The coreless motor 10 has no iron core. The coreless motor 10 has a rotor 13, a stator 14 and a rotating shaft 15 in addition to the output shaft 11 and the housing 12. For example, the rotor 13 consisting of a cylindrical magnet, the stator 14 consisting of a cylindrical coil, and the rotating shaft 15 can be coaxially disposed inside the tubular housing 12, as exemplified by FIG. 3. The rotor 13 is fixed to the rotating shaft 15. The rotating shaft 15 is coupled to the output shaft 11 through the speed reducer composed of the gears 9, such as pinion gears, sun gears, planet gears and/or internal gear. A part of the output shaft 11 is projected from the housing 12.

Accordingly, when the rotating shaft 15 rotates together with the rotor 13, torque adjusted by the gears 9 is output from the output shaft 11. Note that, the rotor 13 may consist of a coil while the stator 14 may consist of a magnet. In this case, the speed reducer can be built in the coreless motor 10 by disposing the speed reducer composed of the gears 9 inside the rotor 13.

In general, a coreless motor outputs small torque compared with the typical electric motor having a core since the coreless motor has no core. Accordingly, it has been conventionally considered that a coreless motor is unsuitable for an electric motor for rotating a tool T. That is, it has been considered that it is realistic to couple gears to an electric motor having a core in order to generate torque required for cutting of a workpiece W, On the other hand, torque required for the tool driving device 1 for hole processing which a user carries by hand for the purpose of use is about 1 Nm to 20 Nm which is extraordinarily small compared with that required for a machine tool, such as a machining center or a milling machine. Accordingly, it became clear that the coreless motor 10 having the gears 9 inside the housing 12 could generate torque usable for cutting. As a concrete example, the coreless motor 10 which can output rated torque of about 10 Nm to 15 Nm by disposing two stages of planet gears in series inside the housing 12 is commercially available.

Accordingly, although torque output from the coreless motor 10 is still small compared with torque output from the typical electric motor having a core, the coreless motor 10 can be coupled to the spindle 3 without coupling a gear head housing gears since the gears 9 can be built in the coreless motor 10. As a result, downsizing and weight reduction of the tool driving device 1 can be attained so that the tool driving device 1 can be easily carried.

As a matter of course, a motor having a core may be used as the first electric motor 4 while the gears 9 may be coupled to the outside of the first electric motor 4. In case of coupling the gears to the outside of the first electric motor 4, the rotation axis of the output shaft 11 of the first electric motor 4 and the rotation axis of the spindle 3 may be disposed in parallel to each other. Conversely, the rotation axis of the output shaft 11 of the first electric motor 4 and the rotation axis of the spindle 3 may be disposed in non-parallel or perpendicular to each other using a bevel gear or the like.

On the other hand, when the coreless motor 10 in which the gears 9 are built is used as the first electric motor 4, and the rotation axis of the output shaft 11 of the first electric motor 4 and the rotation axis of the spindle 3 are disposed on a same straight line, as illustrated, downsizing and weight reduction of the tool driving device 1 can be attained, as mentioned above.

The cutting resistance transmitted from the tool T to the spindle 3 includes the cutting resistance in the rotating direction of the spindle 3 as well as the cutting resistance in the rotation axis direction of the spindle 3. The cutting resistance, in the rotating direction of the spindle 3, applied from the tool T for hole processing to the spindle 3 is referred to as cutting torque. On the other hand, the cutting resistance, in the rotation axis direction of the spindle 3, applied from the tool T for hole processing to the spindle 3 is referred to as thrust resistance.

It is necessary to couple the spindle 3 to the output shaft 11 of the first electric motor 4. Thus, if the end face on the back end side of the spindle 3 is fixed to the end face of the output shaft 11, both the cutting torque and the thrust resistance from the tool T are transmitted from the spindle 3 to the output shaft 11 of the first electric motor 4.

Not only when the first electric motor 4 is the coreless motor 10, but also when the first electric motor 4 is a motor having a core, the first electric motor 4 has structure which supports the output shaft 11 only from the radial directions of the output shaft 11 with radial ball bearings or gears. Therefore, the output shaft 11 of the first electric motor 4 may be unable to fully oppose the thrust resistance transmitted from the spindle 3 although the output shaft 11 of the first electric motor 4 can fully oppose the cutting torque below 20 Nm. Specifically, when the thrust resistance applied on the output shaft 11 becomes excessive beyond an allowable range of the first electric motor 4, the central axis of the output shaft 11 may become eccentric and thereby quality of hole processing may deteriorate.

Accordingly, the spindle 3 can be coupled to the output shaft 11 of the first electric motor 4 so that the thrust resistance may not be transmitted from the spindle 3 to the output shaft 11 of the first electric motor 4 while the torque may be transmitted between the output shaft 11 and the spindle 3.

Figure 4:
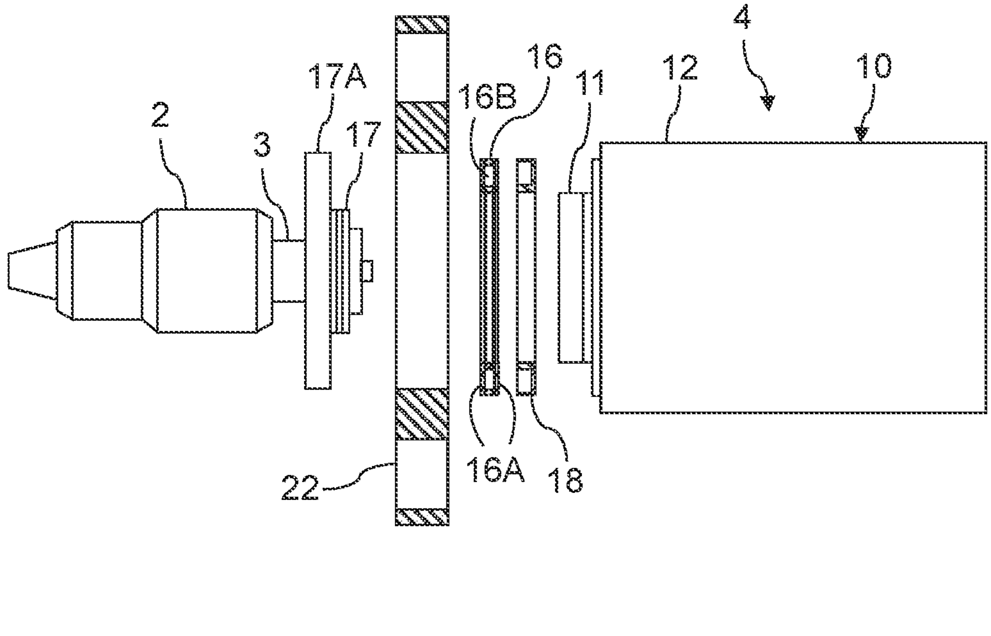
FIG. 4 is an exploded view showing a method of coupling the spindle shown in FIG. 1 to the first electric motor.
Figure 5:
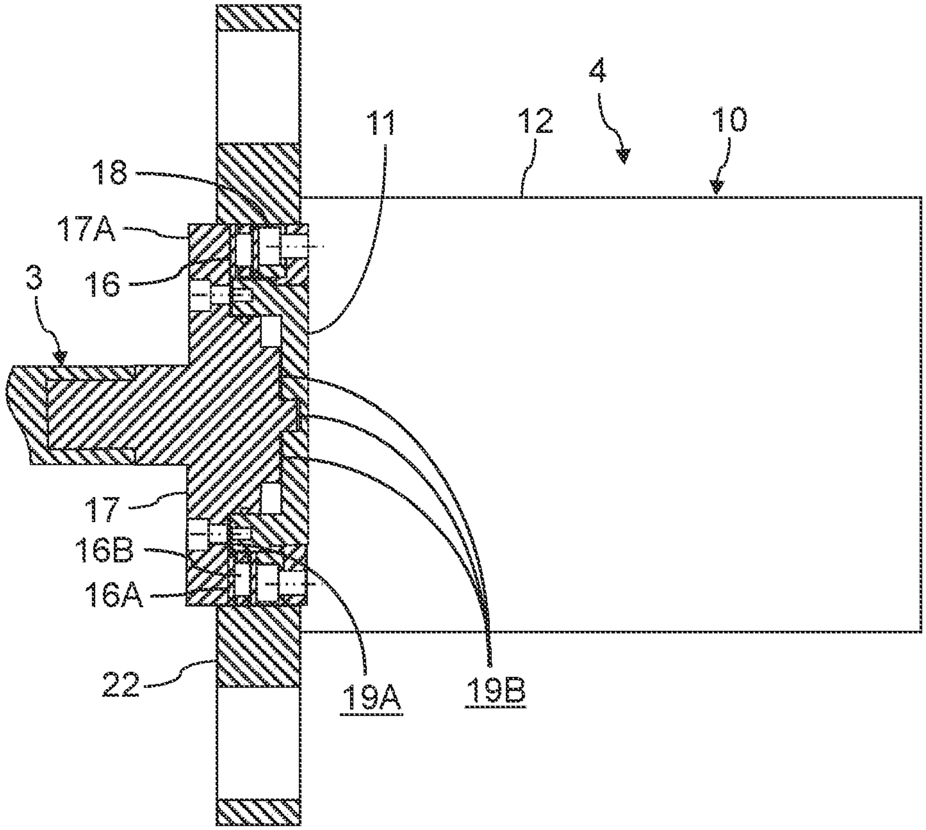
FIG. 5 is an enlarged partial longitudinal sectional view showing the method of coupling the spindle shown in FIG. 1 to the first electric motor.

FIG. 4 is an exploded view showing a method of coupling the spindle 3 shown in FIG. 1 to the first electric motor 4. FIG. 5 is an enlarged partial longitudinal sectional view showing the method of coupling the spindle 3 shown in FIG. 1 to the first electric motor 4.

As exemplified by FIG. 4 and FIG. 5, a thrust bearing 16 can be attached to the housing 12 of the first electric motor 4, and the spindle 3 can be brought into contact with the thrust bearing 16 so that the thrust resistance transmitted from the tool T to the spindle 3 may be applied on the thrust bearing 16. It is not necessary to fix the thrust bearing 16 to any of the housing 12 and the spindle 3. What is necessary is to dispose the thrust bearing 16 at an appropriate position so that the thrust resistance from the spindle 3 may be transmitted to the thrust bearing 16.

The thrust bearing 16 is annular while the typical rear end part of the spindle 3 is rod-shaped. Thus, an annular adapter 17 with an annular flange 17A according to the diameter and shape of the thrust bearing 16 can be coupled to the end portion, on the first electric motor 4 side, of the spindle 3, and the spindle 3 can be brought into contact with the thrust bearing 16 through the adapter 17. Thereby, the thrust resistance can be received by the housing 12 of the first electric motor 4 instead of the output shaft 11 of the first electric motor 4. The adapter 17 can be joined to the rear end portion of the spindle 3 by threading, welding, press fitting or the like so that the torque and the cutting resistance may be transmitted.

When the first electric motor 4 is the coreless motor 10 in which the gears 9 are built, the spindle 3 is coupled to the housing 12 of the first electric motor 4 with the thrust bearing 16 therebetween without coupling a gear head, as illustrated. Meanwhile, when the first electric motor 4 is a motor outside which the gears 9 are coupled, the spindle 3 can be coupled to a gear head housing the gears 9 with the thrust bearing 16 therebetween.

The thrust bearing 16 is a ball bearing or roller bearing which can receive an axial load. The ball bearing has two thrust washers and balls which can roll between the thrust washers. Meanwhile, the roller bearing has two thrust washers 16A and rollers 16B which can roll between the thrust washers 16A, as exemplified by FIG. 5.

The ball bearing is suitable for high-speed rotation since progress of wear of the balls is slow compared with that of the rollers 16B. Meanwhile, in case of low-speed rotation, using the roller bearing leads to improvement of quality of hole processing since the rollers 16B each of which contacts with each thrust washer 16A on a straight line are excellent in stability compared with the balls each of which contacts with each thrust washer on a curved line or a point. The rated rotating speed of the coreless motor 10 in which the gears 9 are built is about less than 500 rpm. Accordingly, the roller bearing of which the rollers 16B roll may be used as the thrust bearing 16, as exemplified by FIG. 5.

Figure 6:
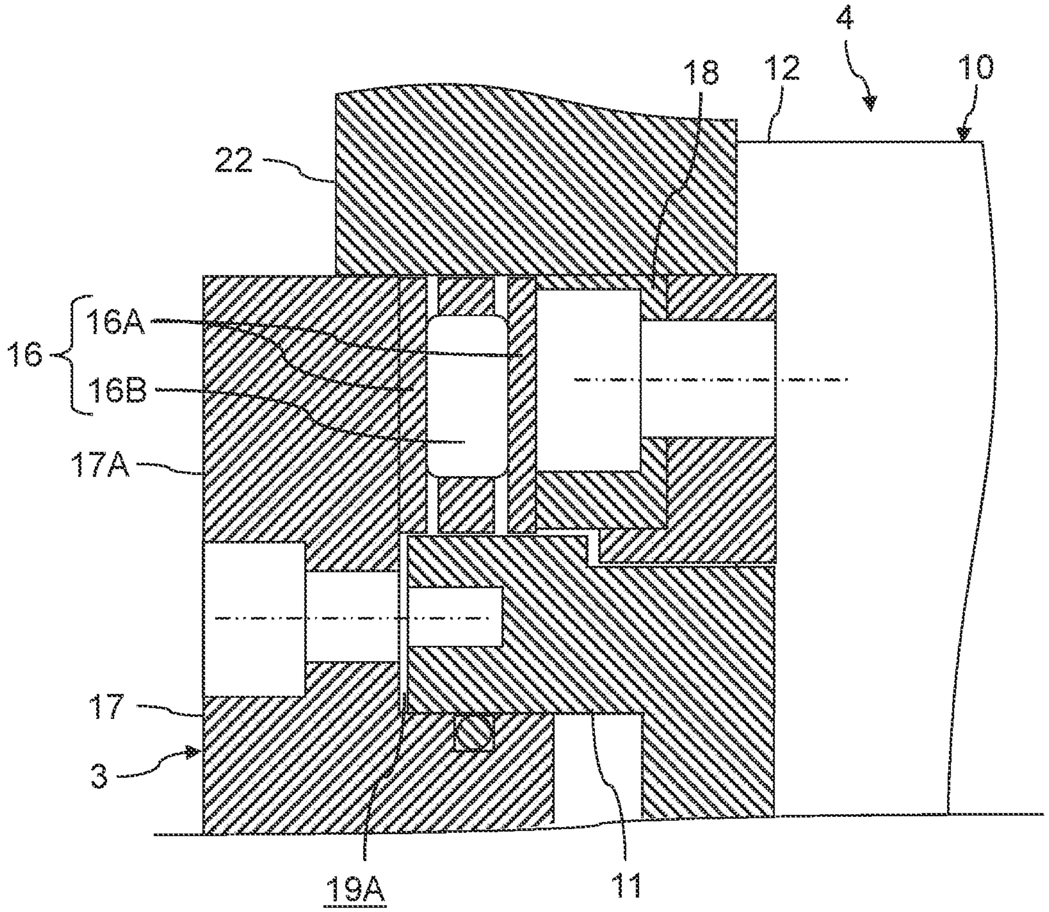
FIG. 6 is an enlarged partial sectional view showing a method of coupling the adapter shown in FIG. 5 to the first electric motor.
Figure 7:
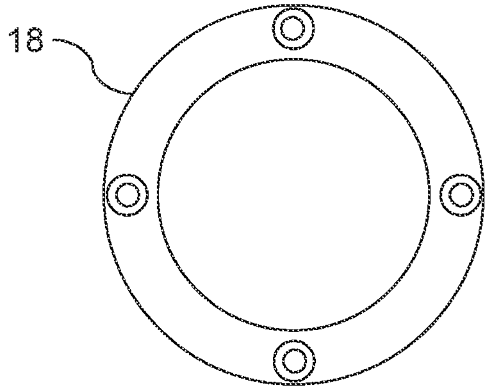
FIG. 7 is a left side view of a pedestal shown in FIG. 4.

FIG. 6 is an enlarged partial sectional view showing a method of coupling the adapter 17 shown in FIG. 5 to the first electric motor 4. FIG. 7 is a left side view of a pedestal 18 shown in FIG. 4.

In order that the torque output from the output shaft 11 of the first electric motor 4 may be transmitted to the spindle 3 while the thrust resistance from the spindle 3 may not be received by the output shaft 11 but may be received by the thrust bearing 16, it is necessary not only to just dispose the thrust bearing 16 but also to prevent each face of the output shaft 11, of which normal direction is the rotation axis direction of the output shaft 11, from contacting with the adapter 17, and bring the annular supporting face of the flange 17A, of which normal direction is the rotation axis direction of the spindle 3, formed on the adapter 17 attached to the rear end part of the spindle 3, into contact with only the thrust bearing 16.

When the thickness of the thrust bearing 16 in the rotation axis direction is thicker than the length of the part of the output shaft 11, projected from the housing 12, one of the thrust washers 16A of the thrust bearing 16 can be disposed so as to directly contact with the housing 12. In this case, the other of the thrust washers 16A of the thrust bearing 16 projects from the end face of the output shaft 11. Accordingly, the flange 17A of the adapter 17 on the rear end side of the spindle 3 can be brought into contact with only the thrust washer 16A without being brought into contact with the end face of the output shaft 11.

Nevertheless, the thickness of the thrust bearing 16 in the rotation axis direction is often thinner than the length of the part of the output shaft 11, projected from the housing 12. Accordingly, an annular pedestal 18 can be disposed outside the output shaft 11 projected from the housing 12 so that the annular pedestal 18 may be interposed between the thrust bearing 16 and the housing 12 of the electric motor 4 in the rotation axis direction of the spindle 3. Thereby, the sum total of the thickness of the thrust bearing 16 and the thickness of the pedestal 18 can be made thicker than the length of the part of the output shaft 11, projected from the housing 12.

That is, the annular pedestal 18 can be sandwiched between the thrust bearing 16 and the housing 12 as a shim. As shown in FIG. 5 to FIG. 7, stepped through holes can be formed in the annular pedestal 18, having a through hole for passing the output shaft 11 at the center, in order to allow the pedestal 18 to be fixed using bolts. Thereby, the pedestal 18 can be fixed to the housing 12 with bolts.

Thus, at least a part of the thrust washer 16A of the thrust bearing 16 on the spindle 3 side can be projected from the end face on the spindle 3 side of the output shaft 11 toward the spindle 3 side. Then, the flange 17A of the adapter 17 for being brought into contact with the thrust bearing 16 can be fixed to the output shaft 11 with bolts in a state that the flange 17A has been brought into contact with the thrust washer 16A on the spindle 3 side while a clearance 19A has arisen between the flange 17A and the end face of the output shaft 11.

Thereby, the torque can be transmitted from the output shaft 11 to the spindle 3 through the adapter 17 while the thrust resistance can be transmitted from the spindle 3 to the housing 12 of the first electric motor 4 through the adapter 17, the thrust bearing 16 and the pedestal 18.

In the illustrated example, the end portion of the output shaft 11 of the first electric motor 4 is cylindrical, and therefore the end face of the output shaft 11 is annular. Accordingly, the adapter 17 has, on the rear end side, a columnar projection, having level differences, for inserting into the inside of the cylindrical output shaft 11 while securing the coaxiality so that the rotation axis direction of the adapter 17 and the rotation axis direction of the output shaft 11 may lie on a same straight line. That is, the circular rear end face of the adapter 17 is located backward of the annular supporting face formed on the flange 17A on the rear end side.

Also in this case, clearances 19B are formed between rear end faces of the adapter 17, of which normal directions are the rotation axis direction of the adapter 17, and faces of the output shaft 11, of which normal directions are the rotation axis direction of the output shaft 11, respectively so that the thrust resistance may not be transmitted from the adapter 17 to the output shaft 11. On the other hand, side surfaces of the columnar rear end portions of the adapter 17 contact with inner surfaces of the cylindrical output shaft 11 in the rotation radius direction in order to secure the coaxiality between the adapter 17 and the output shaft 11, and an O ring may be interposed.

In case of the output shaft 11 having a columnar end part, what is necessary is to make the rear end part of the adapter 17 cylindrical, and insert the tip of the output shaft 11 into the inside of the adapter 17 with bringing the tip of the output shaft 11 into contact with the adapter 17 only in the rotation radius direction.

Although the thrust resistance is transmitted from the spindle 3 to the housing 12 of the first electric motor 4 through the adapter 17, the thrust bearing 16 and the pedestal 18, the strength of the housing 12 of the first electric motor 4 has not been designed so that the housing 12 can withstand the thrust resistance through the same area as a cross section area of the spindle 3. Therefore, it is desirable to transmit the thrust resistance to the housing 12 through an area as large as possible. In other words, it is desirable to make pressure of the thrust resistance to be transmitted to the housing 12 as small as possible.

For that purpose, it is important to use the thrust bearing 16 having the thrust washers 16A whose areas are as large as possible. That is, it is desirable to use the thrust bearing 16 having the thrust washers 16A whose outside diameter is large and inside diameter is small. Actually, a thrust roller bearing whose outside diameter was 70 mm and inside diameter was 50 mm was disposed outside the output shaft 11 whose diameter was 50 mm together with the pedestal 18. As a result, it was confirmed that the housing 12 could withstand about 10 times larger thrust resistance than that in a case where the thrust resistance was received by the output shaft 11 without disposing the thrust roller bearing.

Note that, also in a case where the output shaft 11 of the first electric motor 4 or the spindle 3 is supported by two or more radial bearings coupled in series, the thrust resistance can be received by the radial bearings as long as the number of the radial bearings is enough. Nevertheless, it is necessary to couple many radial bearings since each radial bearing does not have structure for withstanding a load in the axial direction. Consequently, the length of radial bearings in the axial direction becomes remarkably long compared with the length of the thrust bearing 16. Accordingly, it is more desirable to receive the thrust resistance with the thrust bearing 16 by inserting the output shaft 11 of the first electric motor 4 into the inside of the thrust bearing 16, from a viewpoint of attaining miniaturization and weight saving of the tool driving device 1.

In order to feed out the tool T and the spindle 3 towards a hole processing position of the workpiece W, it is necessary to position the tool driving device 1 to the workpiece W. The positioning member 5 is for positioning the tool driving device 1 to the workpiece W. Although a positioning bush 20, having a flange-like part in the rear end, is attached to the tip portion of the guide 6 as the positioning member 5 in the example shown in FIG. 1 and FIG. 2, another member, such as a concentric collet or a fixing tool disclosed by Japanese Patent Application Publication JP 2014-008586A, may be attached as the positioning member 5.

Note that, a concentric collet is one of examples of the positioning member 5, which has two or more slits. A concentric collet has a centering function that the diameter of the concentric collet expands when a collet bush is inserted into the inside of the concentric collet. A member attached to the tip of the tool driving device 1 is referred to as a nosepiece. The positioning bush 20 attached as a part of the nosepiece is referred to as a bushing tip.

For example, the guide 6 can be composed of a fore plate 6A, a rear plate 6B and two shafts 6C coupling the fore plate 6A to the rear plate 6B. The two shafts 6C are disposed in parallel to each other so that each of the length directions may become the feeding direction of the tool T and the spindle 3. Then, the positioning bush 20 can be fixed to the fore of the fore plate 6A toward the advancing direction of the spindle 3 so that the central axis of the through hole of the positioning bush 20 and each of the tool axis AX, the rotation axis of the spindle 3, and the feeding direction of the tool T and the spindle 3 may lie on a same straight-line, On the other hand, the rear plate 6B can be fixed to the housing of the electric actuator 7 with bolts or the like. Thereby, the positioning bush 20, the fore plate 6A, the two shafts 6C and the rear plate 6B are fixed to the housing of the electric actuator 7 as a non-driven unit. Accordingly, the non-driven unit of the tool driving device 1 can be fixed to the workpiece W in a state that the non-driven unit of the tool driving device 1 has been positioned to the workpiece W by the positioning bush 20.

Figure 8:
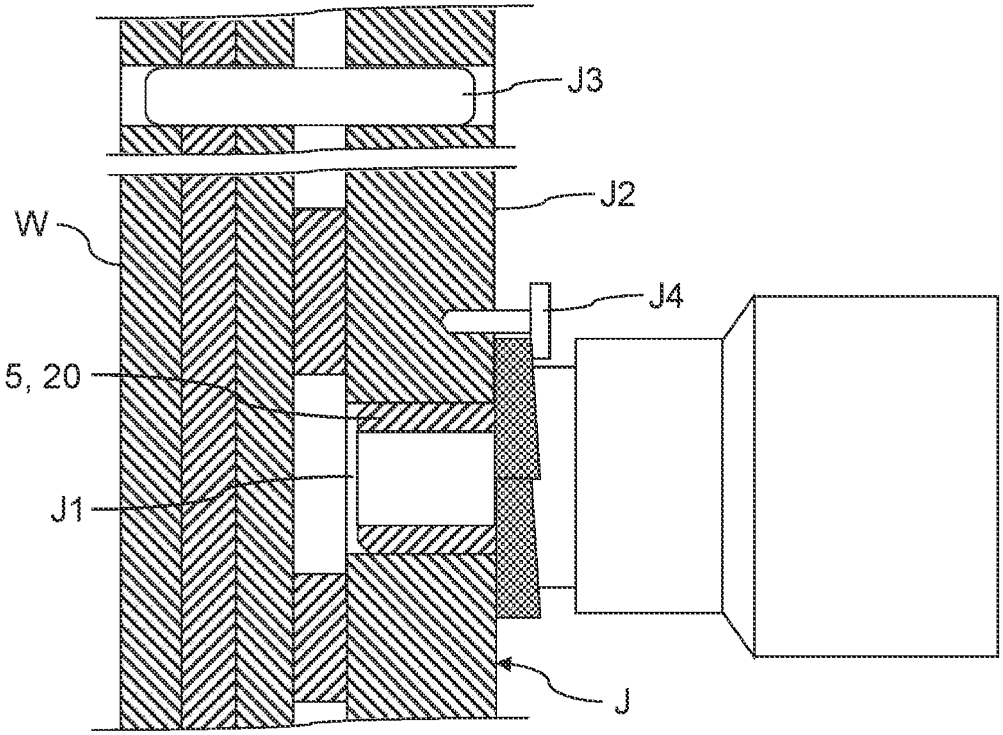
FIG. 8 shows an example of the tool driving device shown in FIG. 1 positioned to the workpiece with the positioning bush.

FIG. 8 shows an example of the tool driving device 1 shown in FIG. 1 positioned to the workpiece W with the positioning bush 20.

The tool driving device 1 can be positioned and fixed to the workpiece W indirectly using a drilling jig J. As a typical concrete example, a positioning hole J1 can be formed in a drilling plate J2, and the drilling plate J2 can be fixed to the workpiece W in a state that the drilling plate J2 has been positioned using a reference hole of the workpiece W with a positioning pin J3, a pin bolt or the like. Then, the flange-like part of the positioning bush 20 can be fixed to the drilling plate J2 with a setscrew J4 in a state that the positioning bush 20 has been inserted into the positioning hole J1 of the drilling plate J2. As a matter of course, the tool driving de vice 1 may be directly positioned and fixed to the workpiece W by inserting the positioning bush 20 into a prepared hole formed in the workpiece W.

When the positioning member 5, such as the positioning bush 20, is fixed to the workpiece W directly or indirectly, the guide 6 to the tip of which the positioning member 5 is fixed is also fixed to the workpiece W. The guide 6 is a unit, having no power source, for moving the tool T and the spindle 3 relatively to the workpiece W and the positioning member 5 in the rotation axis direction.

When the guide 6 has the structure that the fore plate 6A is coupled to the rear plate 6B with the two shafts 6C, as exemplified by FIG. 1 and FIG. 2, two cylindrical sliders 21, which slidably fit to the two shafts 6C respectively and slide in the length direction of the shafts 6C, can be used for coupling a moving plate 22 to the two shafts 6C. The moving plate 22 can be fixed to the housing 12 of the first electric motor 4.

In this case, the first electric motor 4, the spindle 3 fixed to the output shaft 11 of the first electric motor 4 through the adapter 17, the holder 2 fixed to the spindle 3, and the tool T held with the holder 2 can be linearly slid in the length direction of the shafts 6C, i.e., in the feeding direction of the tool T and the spindle 3. That is, the first electric motor 4, the spindle 3, the holder 2, and the tool T can be moved in the feeding direction relatively to the guide 6 fixed to the workpiece W with the positioning member 5, such as the positioning bush 20.

The electric actuator 7 has a power source. The electric actuator 7 advances and retreats the tool T together with the spindle 3 and the holder 2 relatively to the guide 6 in the feeding direction and the rotation axis direction of the spindle 3. The electric actuator 7 is composed of at least one machine element, for reciprocating the spindle 3 and the holder 2 linearly, and a second electric motor 23 for powering the at least one machine element. Namely, the tool driving device 1 includes the second electric motor 23 for moving the tool T and the spindle 3 in the feeding direction in addition to the first electric motor 4 for rotating the tool T and the spindle 3.

For example, the electric actuator 7 can be composed of a ball screw 24, a pusher 25, a rotor 26, a first pulley 27, a second pulley 28 and a power transmission belt 29 in addition to the electric motor 23, as exemplified by FIG. 1 and FIG. 2. The first pulley 27 is fixed to the output shaft of the second electric motor 23. The second pulley 28 is fixed to the rotor 26. The power transmission belt 29 is supported by the first pulley 27 and the second pulley 28.

The rotor 26 has cylindrical structure. An internal thread is formed on at least a part of the inner surface of the rotor 26. One end of the ball screw 24 is projected from the housing of the electric actuator 7. The pusher 25 is fixed to the projected tip of the ball screw 24. The other end of the ball screw 24 is inserted into the hollow rotor 26. The external thread of the ball screw 24 is fastened to the internal thread of the rotor 26.

When the second electric motor 23 of the electric actuator 7 having the above-mentioned configuration is operated, the first pulley 27 is rotated and thereby the torque of the first pulley 27 is transmitted to the second pulley 28 with the power transmission belt 29. Thereby, the rotating speed of the output shaft of the second electric motor 23 is reduced, and the torque output from the output shaft of the second electric motor 23 is adjusted. When the second pulley 28 is rotated, the rotor 26 is also rotated and thereby the ball screw 24 fastened to the internal thread of the rotor 26 moves in the length direction.

Accordingly, the pusher 25 fixed to the tip of the ball screw 24 can be advanced and retreated in the feeding direction of the tool T and the spindle 3 according to the rotating direction of the ball screw 24 by directing the length direction of the ball screw 24 to the feeding direction of the tool T and the spindle 3. Therefore, coupling the pusher 25 to the housing 12 of the first electric motor 4 makes it possible to reciprocate the tool T and the spindle 3 together with the first electric motor 4 in the feeding direction.

Note that, a speed reducer composed of the first pulley 27, the second pulley 28 and the power transmission belt 29 may be composed of gears. The second electric motor 23 may rotate a ball screw while the pusher 25 may be fixed to a member having an internal thread fastened to the ball screw so that the pusher 25 may be reciprocated in the feeding direction of the tool T and the spindle 3. That is, a ball screw may be used as the rotor rotated by the second electric motor 23 while an internal thread may be formed on a member to be moved linearly.

As a concrete example, a ball screw may be fastened to an internal thread formed on the inner surface of a cylindrical rod so that the hollow rod may be reciprocated in the feeding direction of the tool T and the spindle 3 by rotation of the ball screw. In this case, the pusher 25 is attached to the tip of the rod. Alternatively, a bracket having an internal thread may be fastened to a ball screw so that the bracket may be reciprocated in the feeding direction of the tool T and the spindle 3 by rotation of the ball screw. In this case, the pusher 25 is attached to the bracket.

When the first electric motor 4 is pushed out in the feeding direction by the pusher 25, the thrust resistance is applied on the pusher 25. Therefore, it is desirable to dispose the pusher 25 so that the reciprocation pathway of the pusher 25 and the rotation axis of the spindle 3 may lie on a same straight line, from a viewpoint of preventing an unnecessary moment from arising. In addition, from a viewpoint of fully securing force for pushing out the pusher 25 against the thrust resistance by the electric actuator 7, it is desirable to dispose the pusher 25 so that the reciprocation pathway of the pusher 25 and the length direction of the ball screw may lie on a same straight line.

Accordingly, when the stability of the electric actuator 7 is important, it is desirable to configure the electric actuator 7 so that a rod consisting of the ball screw 24 or a cylindrical rod on the inner surface of which an internal thread fasten to a ball screw is formed may be reciprocated in the rotation axis direction of the spindle 3, and to attach the pusher 25 to the tip of the reciprocated rod.

On the other hand, when the pusher 25 is attached to a bracket reciprocated in the rotation axis direction of the spindle 3 by rotation of a ball screw, the electric actuator 7 can be disposed so that the length direction of the ball screw may become parallel to the rotation axis of the spindle 3. Accordingly, the overall length of the tool driving device 1 can be shortened by disposing the electric actuator 7 adjacently to the first electric motor 4 in a direction perpendicular to the rotation axis of the spindle 3.

Note that, examples of the machine element for changing rotation generated by the second electric motor 23 to linear movement include not only a ball screw mentioned above, but also a rack-and-pinion, which is a kind of gears, and a track, such as a power transmission belt moved by pulleys, or a chain moved by sprockets. Therefore, the pusher 25 may be reciprocated by the electric actuator 7 composed of a desired machine element and the second electric motor 23.

In general, the strength of the housing 12 of the first electric motor 4 has not been designed so as to withstand the thrust resistance applied locally, as mentioned above. Therefore, it is not desirable to directly press the pusher 25 to the housing 12 of the first electric motor 4. Accordingly, a reinforcing frame 30 can be fixed to the housing 12 of the first electric motor 4 so that the reinforcing frame 30 may be pushed out by the pusher 25.

In the example shown in FIG. 1 and FIG. 2, the moving plate 22 sliding along the shafts 6C of the guide 6 is also fixed to the housing 12 of the first electric motor 4, as mentioned above. The strength of the moving plate 22 can be designed so as to withstand the thrust resistance. Accordingly, the reinforcing frame 30 pushed out by the pusher 25 can be fixed to the moving plate 22. That is, the reinforcing frame 30 is not directly fixed to the housing 12 of the first electric motor 4, but can be indirectly fixed to the housing 12 of the first electric motor 4 through the moving plate 22.

Figure 9:
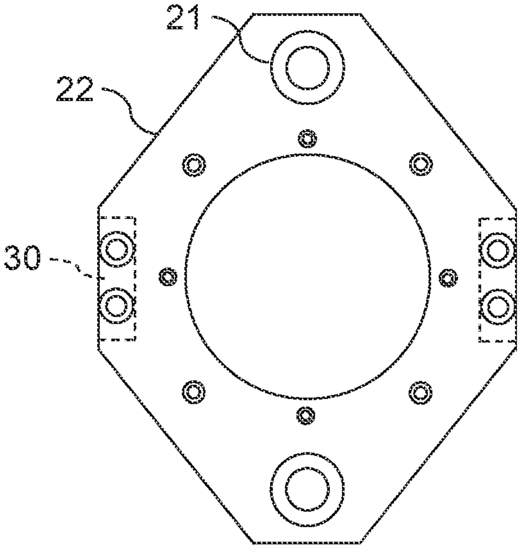
FIG. 9 is an enlarged left side view of the moving plate and the reinforcing frame shown in FIG. 1.

FIG. 9 is an enlarged left side view of the moving plate 22 and the reinforcing frame 30 shown in FIG. 1.

As exemplified by FIG. 1, FIG. 2, FIG. 9 and the like, the moving plate 22, at the center of which the through hole is formed for disposing the output shaft 11 of the first electric motor 4 and the thrust bearing 16, can be fixed to the fore of the housing 12 of the first electric motor 4 with bolts. For that purpose, through holes for the bolts for fixing the moving plate 22 to the housing 12 are formed in the moving plate 22. In addition, the sliders 21 slidably fitting to the shafts 6C of the guide 6 respectively are attached to the moving plate 22.

Furthermore, two rectangular plates each longer than the length of the housing 12 can be fixed to the rear of the moving plate 22 as a part of the reinforcing frame 30 by bolts, welding or the like. In the example shown in FIG. 9, stepped through holes are formed in the reinforcing frame 30 so that the two rectangular plates can be fixed to the reinforcing frame 30 with bolts. The reinforcing frame 30, which does not contact with the housing 12 but encloses the housing 12, can be formed by coupling the end portions of the two rectangular plates to each other by another plate. Moreover, the reinforcing frame 30 can be integrated with the moving plate 22.

Thus, it becomes possible to push out the first electric motor 4 in the feeding direction by applying force from the pusher 25 to the reinforcing frame 30. That is, the reinforcing frame 30 can be moved relatively to the guide 6 by the electric actuator 7. In this case, the thrust resistance transmitted from the thrust bearing 16 to the housing 12 is transmitted from the housing 12 to the moving plate 22, and subsequently, transmitted from the moving plate 22 to the reinforcing frame 30.

Accordingly, a sensor 31 consisting of a load cell 32 for measuring the cutting resistance can be attached to the reinforcing frame 30 so that force from the pusher 25 may be applied on the load cell 32. That is, the load cell 32 for measuring the thrust resistance transmitted from the spindle 3 can be coupled to the rear end portion of the spindle 3 through the adapter 17, the thrust bearing 16, the pedestal 18, the housing 12 of the first electric motor 4, the moving plate 22 and the reinforcing frame 30.

Therefore, the load cell 32 measures the thrust resistance which is transmitted from the spindle 3 to the housing 12 through the thrust bearing 16 and the pedestal 18, and subsequently, transmitted from the housing 12 to the reinforcing frame 30 integrated with the moving plate 22. Note that, it is appropriate to determine the mounting position of the load cell 32 so that the central position of the load cell 32 and the rotation axis of the spindle 3 may lie on a same straight line, from a viewpoint of allowing the load cell 32 to measure the thrust resistance more accurately. In addition, it is appropriate to make the reinforcing frame 30 have a shape line symmetric with respect to the rotation axis of the spindle 3 on a section including the rotation axis of the spindle 3.

When the thrust resistance is measured by the load cell 32, the tool driving device 1 can be controlled according to the thrust resistance. As mentioned above, the tool driving device 1 has not only the first electric motor 4 for rotating the tool T and the spindle 3, but also the second electric motor 23 for moving the tool T and the spindle 3 in the feeding direction so that the rotating speed and the feeding speed of the tool T and the spindle 3 can be set independently. Accordingly, each of the rotating speed and the feeding speed of the tool T and the spindle 3 can be automatically controlled based on the thrust resistance measured by the load cell 32.

Therefore, the thrust resistance measured by the load cell 32 is output to the controller 8. The controller 8 is electric circuitry, such as a computer, for controlling the first electric motor 4 and the second electric motor 23 by outputting electric signals.

In order to measure the thrust resistance by the load cell 32, it is necessary to bring the pusher 25 into contact with the load cell 32 so that the thrust resistance may be applied to the pusher 25. When the pusher 25 is constantly brought into contact with the load cell 32, the load cell 32 detects a load also while hole process is not being performed, and therefore no thrust resistance has arisen.

For example, when the load cell 32 is pinched by the reinforcing frame 30 and the pusher 25 in order to fix the load cell 32, a load detected by the load cell 32 does not always become zero since a load is constantly applied from the pusher 25 to the load cell 32. Moreover, when the load cell 32 comes into contact with the pusher 25 while the tool T and the spindle 3 are being retreated after completion of hole processing, a load applied from the electric actuator 7 to the spindle 3 in order to retreat the tool T and the spindle 3 is detected by the load cell 32.

In that case, the controller 8 is required to perform data processing for distinguishing between the thrust resistance and the other load in a load detected by the load cell 32. In addition, calibration may become necessary in order to secure measurement accuracy of the thrust resistance satisfactorily since a load detected by the load cell 32 does not become zero constantly.

Accordingly, the relative positions of the pusher 25 and the load cell 32 can be determined so that a clearance may be formed between the pusher 25 and the load cell 32 when the pusher 25 has been retreated to a retreat position. In addition, the pusher 25 can be coupled to the reinforcing frame 30, to which the load cell 32 is attached, through a sliding mechanism 33, as exemplified by FIG. 1 and FIG. 2. More specifically, the pusher 25 can be coupled to the load cell 32 and the spindle 3 through the sliding mechanism 33 which changes the interval between the pusher 25 and the load cell 32 in the rotation axis direction of the spindle 3.

Figure 10:
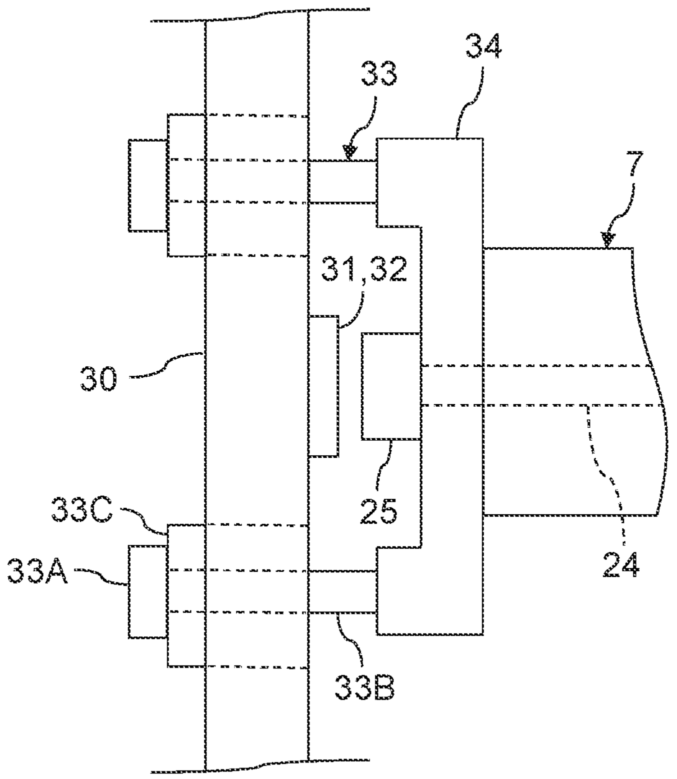
FIG. 10 is an enlarged view of the pusher, the load cell and the sliding mechanism shown in FIG. 2.

FIG. 10 is an enlarged view of the pusher 25, the load cell 32, and the sliding mechanism 33 shown in FIG. 2.

For example, the sliding mechanism 33 can be composed of two disk-shaped stoppers 33A, two shafts 33B and two cylindrical sliders 33C, as exemplified by FIG. 1, FIG. 2 and FIG. 10. The stoppers 33A are fixed to one ends of the shafts 33B respectively. The sliders 33C slidably fit with the shafts 33B respectively. The two shafts 33B are disposed in parallel to each other so that each of the length directions may be a sliding direction parallel to the rotation axis of the spindle 3.

In the illustrated example, the two sliders 33C are fixed to the reinforcing frame 30 at positions between which the load cell 32 is sandwiched. The other ends of the two shafts 33B, to which the stoppers 33A are not attached, are fixed to the vicinity of the tip of the ball screw 24, to which the pusher 25 is attached, through a fixing plate 34. Accordingly, the interval between the pusher 25 and the load cell 32 can be changed by the sliding mechanism 33 freely with no power.

Note that, the sliders 33C may be fixed to the fixing plate 34 attached to the vicinity of the tip of the ball screw 24 while the end portions of the shafts 33B to which the stoppers 33A are is not attached may be fixed to the reinforcing frame 30. Namely, the sliding mechanism 33 composed of the stoppers 33A, the shafts 33B and the sliders 33C may be reversed in the sliding direction of the sliding mechanism 33.

In case of coupling the load cell 32 to the pusher 25 through the sliding mechanism 33 in the illustrated direction, when the pusher 25 is advanced from the retreat position by the electric actuator 7, each of the fixing plate 34, the shafts 33B and the stoppers 33A slides together with the pusher 25 in the advancing direction of the pusher 25 relatively to the reinforcing frame 30 to which the load cell 32 is attached, and eventually the pusher 25 comes into contact with the load cell 32.

Accordingly, when the pusher 25 is further advanced by the electric actuator 7, force toward the advancing direction of the spindle 3 is applied from the pusher 25 to the spindle 3 through the load cell 32 and the reinforcing frame 30. Thereby, the tool T can be fed out together with the spindle 3 in the advancing direction.

While force is being applied from the pusher 25 on the load cell 32 after the pusher 25 comes into contact with the load cell 32, a load is measured by the load cell 32. Accordingly, a load is detected by the load cell 32 even before hole processing is started as long as the spindle 3 is being advanced. Once hole processing is started and thereby the thrust resistance arises, a load which can be regarded as the thrust resistance is detected by the load cell 32.

When hole processing is completed and then the pusher 25 is retreated by the electric actuator 7 in order to retreat the tool T and the spindle 3, the fixing plate 34, the shafts 33B and the stoppers 33A slide together with the pusher 25 in the retreating direction of the pusher 25 relatively to the reinforcing frame 30 to which the load cell 32 is attached. Accordingly, the pusher 25 is pulled apart from the load cell 32. As a result, the load detected by the load cell 32 becomes zero.

When the pusher 25 is further retreated by the electric actuator 7, the disc-like stoppers 33A of the sliding mechanism 33 come into contact with the sliders 33C fixed to the reinforcing frame 30. Thereby, force toward the retreating direction of the pusher 25 is applied from the stoppers 33A to the reinforcing frame 30. As a result, the spindle 3 retreats together with the reinforcing frame 30, to which the load cell 32 is attached, in a state that the pusher 25 is away from the load cell 32.

Thus, a load is detected by the load cell 32 while the spindle 3 is being advanced. Meanwhile, no load is detected by the load cell 32 while the spindle 3 is being retreated. Accordingly, the zero point of the load cell 32 can be set, and it becomes possible to measure the thrust resistance correctly without calibration or the like.

Note that, the pusher 25 advanced and retreated by the electric actuator 7 slides relatively to the load cell 32 at the time of starting to advance the pusher 25 from the retreat position of the pusher 25, where the pusher 25 is retreated most, at the time of starting to retreat the pusher 25, at the time of changing the traveling direction of the retreating pusher 25 to advance the pusher 25, and the like. Therefore, a time lag arises between an advancing operation or retreating operation of the electric actuator 7, and an advancing operation or retreating operation of the spindle 3. Accordingly, it is appropriate to determine the sliding range (stroke) of the sliding mechanism 33, i.e., the maximum value of the clearance formed between the load cell 32 and the pusher 25, as about 1 mm to 3 mm in order to prevent the time lag from becoming too long to a degree that hole processing suffers a negative effect.

The reinforcing frame 30 to which the sliders 33C are attached can be freely slid along the shafts 33B. Therefore, it is appropriate to prepare a stopper 35 which stops retreat of the load cell 32 so that the load cell 32 may not come into contact with the pusher 25 due to inertia force after the pusher 25 has been retreated and stopped at the retreat position. In other words, it is appropriate to prepare the stopper 35 so that the spindle 3 and the reinforcing frame 30 to which the load cell 32 is attached may stop at the retreat position when the spindle 3 and the reinforcing frame 30 are retreated.

For example, the stopper 35 for stopping retreat of the load cell 32 and the spindle 3 at the retreat position can consist of a disk-shaped member, for being brought into contact with one of the sliders 21, which is fixed to one of the shafts 6C of the guide 6 for sliding the moving plate 22 integrated with the reinforcing frame 30, as exemplified by FIG. 1 and FIG. 2. As a matter of course, a bar for being brought into contact with the reinforcing frame 30 may be fixed to one of the shafts 6C of the guide 6 as the stopper 35. Note that, also when the structure of the sliding mechanism 33 is reversed in the sliding direction, it is appropriate to prepare a stopper 35 for stopping retreat of the load cell 32 and the spindle 3 similarly.

The load cell 32 may be fixed to a driven part, such as the ball screw 24, of the electric actuator 7, instead of the reinforcing frame 30. In that case, the load cell 32 is reciprocated by the electric actuator 7, instead of the pusher 25. Nevertheless, it is desirable to fix the load cell 32 to the reinforcing frame 30 having high rigidity, from a viewpoint of avoiding an adverse effect in the measurement accuracy of the thrust resistance due to deflection of the driven part of the electric actuator 7.

When the thrust resistance is measured by the load cell 32, it becomes possible to control the first electric motor 4 and the electric actuator 7 by the controller 8 based on the thrust resistance measured by the load cell 32 so that the rotating speed and the feeding speed of the tool T and the spindle 3 may become the rotating speed and the feeding speed according to the thrust resistance.

Figure 11:
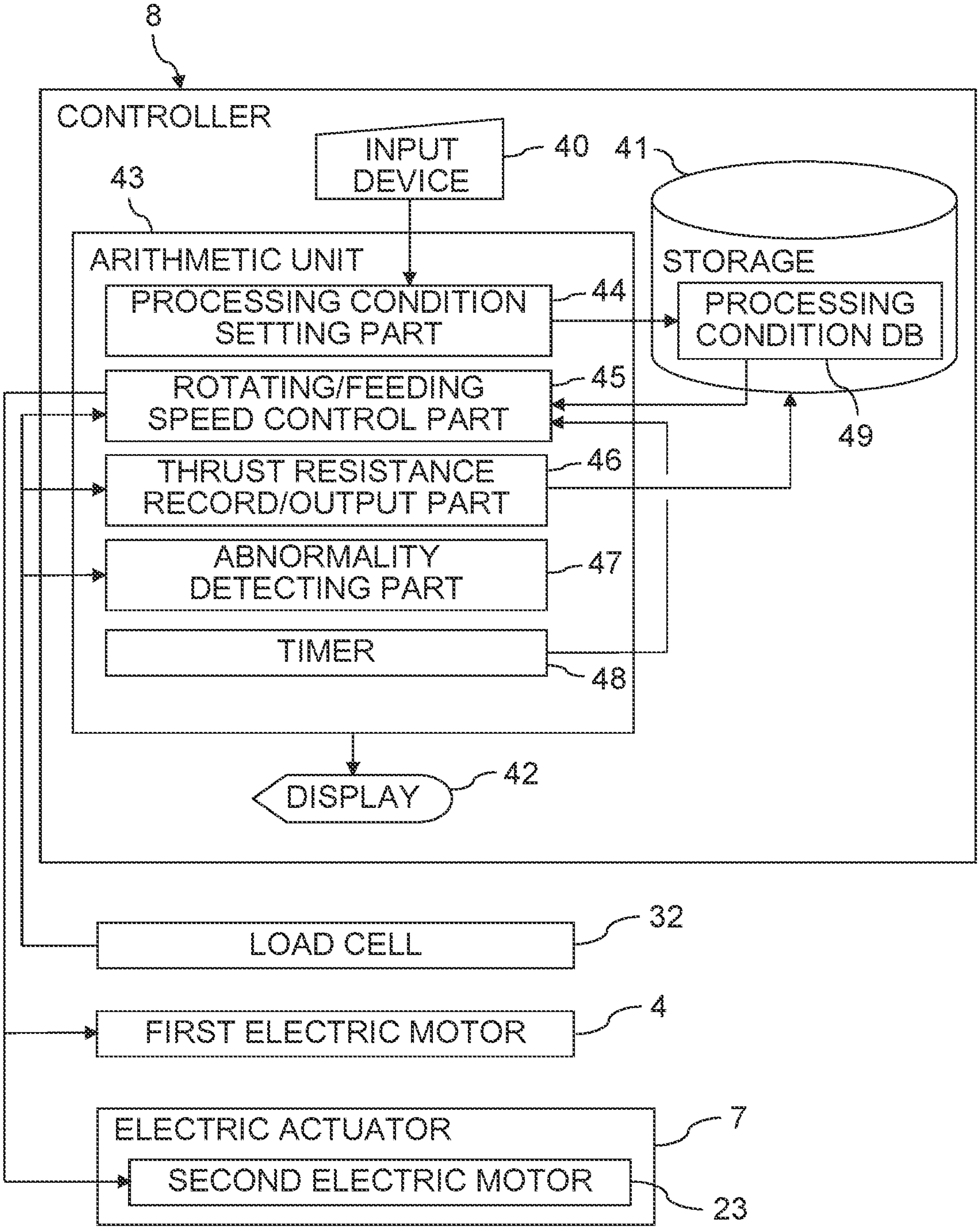
FIG. 11 is a diagram showing an example of detailed configuration of the controller shown in FIG. 1.

FIG. 11 is a diagram showing an example of detailed configuration of the controller 8 shown in FIG. 1.

The controller 8 can consist of electric circuitry including an electronic circuit, such as a computer, having an input device 40, storage 41, a display 42 and an arithmetic unit 43, and necessary electrical equipment, such as an A/D (analog-to-digital) converter, coupled to the electronic circuit. A control program of the tool driving device 1 can be installed into the arithmetic unit 43. Thereby, the arithmetic unit 43 functions as a processing condition setting part 44, a rotating/feeding speed control part 45, a thrust resistance record/output part 46, an abnormality detecting part 47 and a timer 48. Meanwhile, the storage 41 functions as a processing condition database 49.

The processing condition setting part 44 has a function to set conditions of hole processing appropriate for each material, which could be a target of hole processing, based on information input from the input device 40, such as a mouse or a keyboard, and a function to store the set conditions of hole processing in the processing condition database 49. For that purpose, a setting screen of conditions of hole processing can be displayed on the display 42. The setting screen of conditions of hole processing may be a part of an operation screen of the controller 8.

Figure 12:
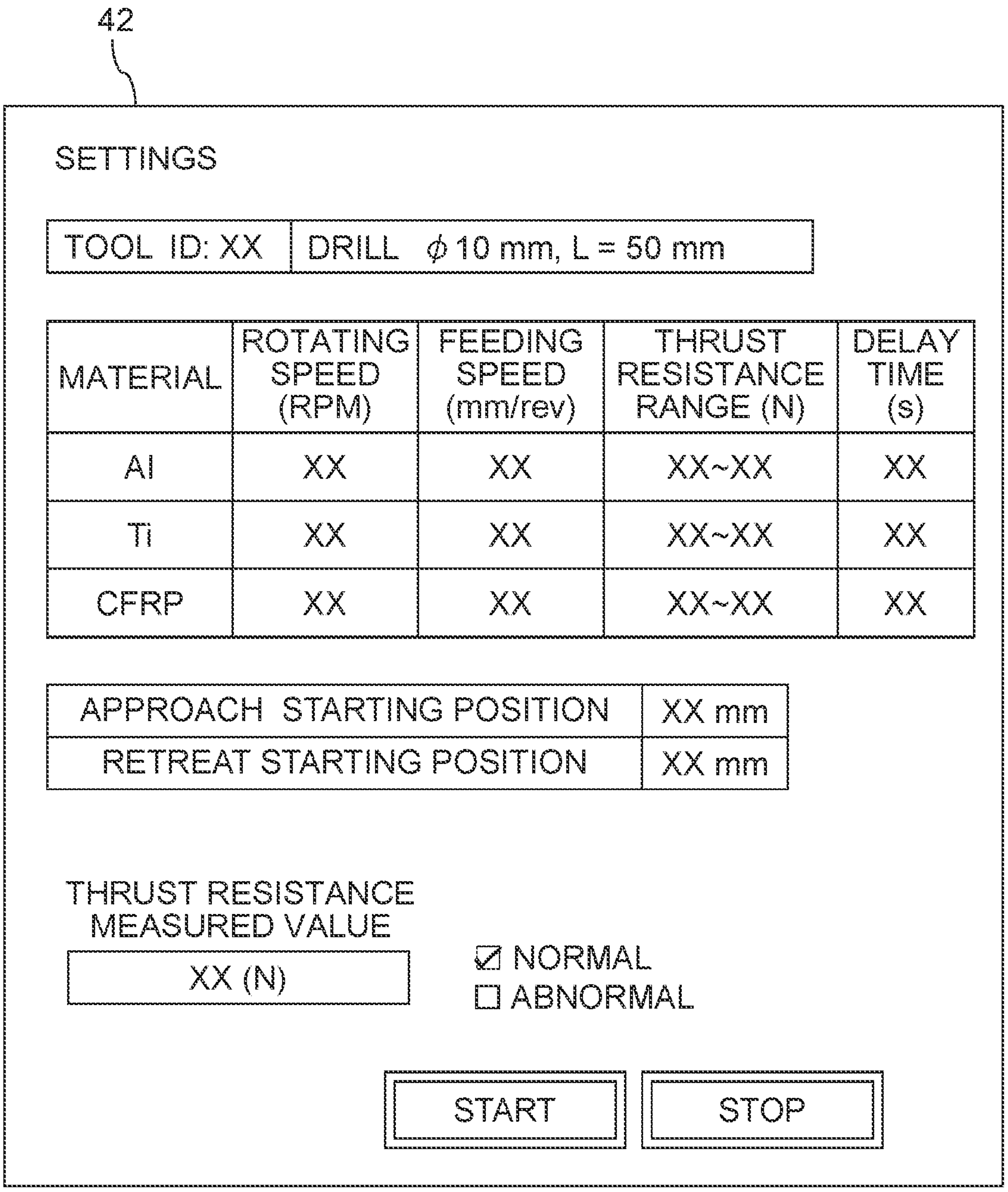
FIG. 12 shows an example of operation screen displayed on the display of the controller shown in FIG. 11.
Figure 13:
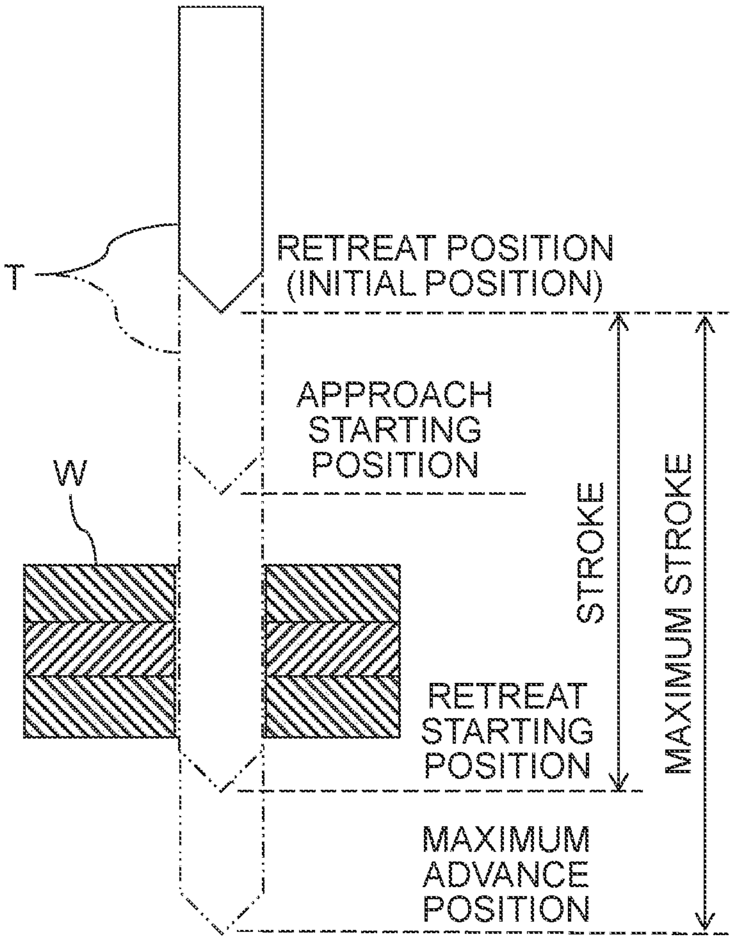
FIG. 13 is a view for explaining a starting position of an approach operation and a starting position of a retreat operation of the tool, which can be set up through the operation screen shown in FIG. 12.

FIG. 12 shows an example of operation screen displayed on the display 42 of the controller 8 shown in FIG. 11. FIG. 13 is a view for explaining a starting position of an approach operation and a starting position of a retreat operation of the tool T, which can be set up through the operation screen shown in FIG. 12.

Each conditions of hole processing can be expressed with the rotating speed (rpm) and the feeding speed (mm/minute) of the tool T and the spindle 3. Each feeding speed of the tool T and the spindle 3 may be expressed as a feeding amount per rotation (mm/rotation).

Appropriate conditions of hole processing are different for each material. Examples of material include a metal, such as aluminum and titanium, and an FRP (fiber reinforced plastic), such as GFRP (glass fiber reinforced plastic) and CFRP (carbon fiber reinforced plastic).

Accordingly, appropriate conditions of hole processing can be set for each material, as exemplified by FIG. 12. Examples of hole processing include drilling of a workpiece W having no prepared hole with a drill, finishing or diameter expanding of a prepared hole of a workpiece W with a drill, and finishing of a hole with a reamer. Appropriate conditions of hole processing differ according to a kind of the hole processing including whether a prepared hole has been formed as well as features of a tool T, such as a material of the tool T, a diameter of the tool T, the number of cutting edges, and structure including the thickness and length of a shank of the tool T. Accordingly, it is appropriate to set appropriate conditions of hole processing for each features of a tool T and each kind of the hole processing.

The thrust resistance arising in hole processing also differs according to features of a tool T, a kind of the hole processing, and a material of a workpiece W, similarly to conditions of hole processing. Accordingly, sets of conditions of hole processing related to values of the thrust resistance can be set in the processing condition setting part 44, and stored in the processing condition database 49. Thereby, a material of a target for hole processing can be specified based on the thrust resistance measured by the load cell 32, and then conditions of the hole processing appropriate for the specified material can be set automatically.

Note that, it is difficult and inappropriate to change the rotating speed and the feeding speed of the tool T into the rotating speed and the feeding speed according to a material specified by detecting the thrust resistance instantaneously after or simultaneously with the specification of the material, from a viewpoint of securing the quality of a hole. Accordingly, a delay time from timing at which a value of the thrust resistance related with a material is detected first until the rotating speed and the feeding speed of the tool T are changed to the rotating speed and the feeding speed according to a specified material, i.e., a time lag, can be set as one of conditions of hole processing.

When the rotating speed and the feeding speed of the tool T are changed according to the thrust resistance measured by the load cell 32, the thrust resistance also changes according to the updated rotating speed and feeding speed of the tool T. Therefore, it is appropriate to set values of the thrust resistance, related to sets of conditions of hole processing in order to specify materials, as possible ranges of values corresponding to the materials.

When the rotating speed and the feeding speed of the tool T are changed according to a material, the thrust resistance may change significantly, or a certain possible range of the thrust resistance corresponding to a material may overlap with another possible range of the thrust resistance corresponding to a different material due to a change of the thrust resistance. In such a case, not only a possible range of the thrust resistance for specifying a material but also a possible range of the thrust resistance after changing the rotating speed and the feeding speed of the tool T according to the material may be set separately.

When the rotating speed and the feeding speed of the tool T become the optimal rotating speed and the optimal feeding speed for a corresponding material, the thrust resistance also becomes the optimal value. Therefore, it can also be said that control for optimizing the rotating speed and the feeding speed of the tool T according to the thrust resistance measured by the load cell 32 is feedback control for optimizing the thrust resistance measured by the load cell 32.

In addition to the rotating speed and the feeding speed of the tool T, a starting position of an approach operation of the tool T after the tool T has approached the workpiece W until the tool T comes into contact with the workpiece W, and a starting position of an retreat operation of the tool T after hole processing, as shown in FIG. 13, can also be set in the processing condition setting part 44. That is, an approach operation can be performed so that the tool T may not collide with the workpiece W at an insufficient rotating speed. In that case, a safe rotating speed and feeding speed of the tool T and the spindle 3 are set for an approach operation of the tool T and the spindle 3. In addition, when the tool T and the spindle 3 are retreated without being advanced up to the maximum stroke, a starting position of a retreat operation of the tool T can be set.

A starting position of an approach operation can be specified as a distance from a position of the tip of the tool T at the retreat position to the starting position of the approach operation. Accordingly, a distance from a position of the tip of the tool T at the retreat position to a starting position of an approach operation can be set according to a length of a portion of the tool T projected from the holder 2 as well as a length of the holder 2 when the holder 2 can be exchanged.

When a starting position of an approach operation is set, it becomes possible to feed out the tool T and the spindle 3 by fast feeding up to the starting position of the approach operation regardless of a load detected by the load cell 32. In addition, rotation of the tool T can be stopped during fast feeding of the tool T. Alternatively, the rotating speed of the tool T can be increased gradually up to a target rotating speed during fast feeding of the tool T.

On the other hand, a starting position of a retreat operation of the tool T can be set as a distance from a position at the tip of the tool T at the retreat position to the maximum depth of a hole to be processed in the workpiece W when the hole is not a through hole. Meanwhile, when a hole to be processed in the workpiece W is a through hole, a starting position of a retreat operation of the tool T can be set as a distance according to a thickness of the workpiece W so that the cutting edges of the tool T may pass through the workpiece W entirely. Setting a starting position of a retreat operation of the tool T corresponds to setting the stroke of the tool T and the spindle 3 to less than the maximum stroke.

In case of processing a through hole in the workpiece W, the thrust resistance decreases gradually down to zero once the tip of the tool T passes through the workpiece W. In this case, the rotating speed and the feeding speed of the tool T should not be decreased until a portion having the maximum diameter of the tool T passes through the workpiece W entirely. Accordingly, it is appropriate to set control conditions not so as to change the rotating speed and the feeding speed of the tool T and the spindle 3 until the tool T arrives at a starting position of a retreat operation or the maximum stroke position in a case where a load detected by the load cell 32 has decreased down to the outside of a range of the thrust resistance related with a material.

When a starting position of a retreat operation of the tool T is set as mentioned above, not only processing of a blind hole having a desired depth becomes easy, but also in a case where a through hole is to be processed without advancing the tool T and the spindle 3 up to the acceptable position, it becomes unnecessary to perform processing for detecting a time, at which the hole processing is completed, and processing for detecting that a portion having the maximum diameter of the tool T has passed through the workpiece W entirely, based on a load detected by the load cell 32. In addition, hole processing of laminated materials, between which a gap is generated, becomes easy.

Note that, a retreat operation of the tool T may also be performed by fast return, similarly to advancing the tool T from the retreat position to a starting position of an approach operation. That is, the tool T can be retreated from a starting position of a retreat operation to the retreat position of the tool T by fast return.

The rotating/feeding speed control part 45 has a function to control the tool driving device 1 based on a load detected by the load cell 32 with reference to the processing condition database 49. Specifically, the rotating/feeding speed control part 45 has a function to acquire a load detected by the load cell 32, and output control signals to the first electric motor 4 and the second electric motor 23 of the electric actuator 7, in a case where the load detected by the load cell 32 becomes within a range of the thrust resistance related with conditions of hole processing, so that hole processing may be performed at a rotating speed and feeding speed of the tool T related with the range of the thrust resistance.

As mentioned above, when the pusher 25 to be pressed against the load cell 32 is at the retreat position, a load detected by the load cell 32 becomes zero since the clearance arises between the load cell 32 and the pusher 25. Accordingly, processing for extracting component of the thrust resistance from each load detected by the load cell 32 is unnecessary, and each load detected by the load cell 32 can be regarded as a value of the thrust resistance although signal processing, such as noise reduction processing, may be performed to each detection signal from the load cell 32.

Although the rotating/feeding speed control part 45 may not necessarily perform processing for identifying a material under processing and outputting identification information of the material, the rotating/feeding speed control part 45 substantially specifies a material based on a measured value of the thrust resistance, and automatically sets hole processing conditions appropriate for the specified material since possible ranges of values of the thrust resistance are related with materials as mentioned above. By this automatic setting of the hole processing conditions, the rotating speed and feeding speed of the tool T and the spindle 3 can be automatically changed to a rotating speed and feeding speed corresponding to the thrust resistance, measured by the load cell 32 in real time, with a delay time previously designated.

A delay time can be generated using the timer 48. Specifically, the rotating/feeding speed control part 45 outputs control signals, for changing the rotating speed and the feeding speed of the tool T and the spindle 3, to the first electric motor 4 and the second electric motor 23 after a delay time set by the timer 48.

In case of hole processing of laminated materials, i.e, a workpiece made by laminating different materials, the thrust resistance changes at the time when the tool T reaches the boundary between the materials. Therefore, the rotating/feeding speed control part 45 can substantially detect that a material to be processed has changed to a different material. Accordingly, it is unnecessary to previously set respective thicknesses of the materials as a part of hole processing conditions, unlike setting of a stroke of the tool T and the spindle 3.

Further, the rotating/feeding speed control part 45 has a function to output control signals to the first electric motor 4 and the second electric motor 23 of the electric actuator 7 not only for controlling the tool driving device 1 in a manual mode in which the rotating speed and the feeding speed of the tool T and the spindle 3 are directly set according to direction information input from the input device 40 as numerical values or the like, but also so that an approach operation of the tool T toward the workpiece W may be performed under conditions stored in the processing condition database 49 while a retreat operation of the tool T may be started at a starting position of the retreat operation of the tool T stored in the processing condition database 49.

Accordingly, after the tool driving device 1 has been set up to the workpiece W, hole processing of the workpiece W can be completed fully automatically as long as an instruction for starting the hole processing in an automatic mode is given to the rotating/feeding speed control part 45 from the input device 40, for example, by pushing a start button displayed as an electronic key on an operation screen.

The thrust resistance record/output part 46 has a function to display a load measured by the load cell 32 on an operation screen of the display 42 or the like in real time, and a function to record the thrust resistance measured by the load cell 32 and store the recorded thrust resistance in the processing condition database 49.

When a load measured by the load cell 32 is displayed, a user can check a material under hole processing. In addition, when the thrust resistance has increased abnormally due to progression of wear of the tool T or chipping of a cutting edge of the tool T, a user can promptly become aware of the abnormally increased thrust resistance, and then interrupt hole processing, as necessary, for example, by pushing a stop button displayed on an operation screen by operation of the input device 40.

On the other hand, when the thrust resistance measured by the load cell 32 is recorded, and then the recorded thrust resistance is related with an unregistered material and stored in the processing condition database 49, setting of hole processing conditions related with values of the thrust resistance corresponding to the newly registered material becomes possible. This also applies to a case where at least one hole processing condition including features of the tool T as well as a material has changed. Also in case of hole processing conditions registered in the processing condition database 49, accumulating measured values of the thrust resistance allows setting of more appropriate hole processing conditions by machine learning or the like.

The abnormality detecting part 47 has a function to detect an abnormality, such as wear or chipping of the tool T, based on a load measured by the load cell 32, and a function to notify a user of an abnormality of the tool T through the display 42 when the abnormality has been detected. As a matter of course, a user may be notified of an abnormality not only through the display 42 but also through an output device, such as a loudspeaker or a lighting system, by sound or light.

An abnormality of the tool T can be detected by threshold processing, for determining whether a value of the thrust resistance measured by the load cell 32 falls within an acceptable range, by setting threshold values for defining the acceptable range of a value of the thrust resistance. Note that, another threshold value may be set to define an acceptable range of a period over which a value of the thrust resistance out of an acceptable range has been continuously measured by the load cell 32. In this case, the abnormality detecting part 47 can be configured to determine that an abnormality has arisen in the tool T, e.g., in a case where a value of the thrust resistance out of an acceptable range has been continuously measured by the load cell 32 for a few seconds.

(A Method of Producing a Hole Processed Product)

Next, a method of producing a hole processed product by hole processing of a workpiece W using the tool driving device 1 will be described.

In case of hole processing of the workpiece W using the tool driving device 1, the thrust resistance which arises in hole processing at an appropriate rotating speed and feeding speed is previously measured for each material of which the workpiece W could be made. Each value of the thrust resistance can be acquired by hole processing of a test piece using the tool driving device 1 as a load measured by the load cell 32 at the rotating speed and the feeding speed of the tool T manually adjusted to appropriate values respectively.

The thrust resistance measured by the load cell 32 is output to the controller 8. Then, the thrust resistance record/output part 46 stores the thrust resistance as time series data consisting of measured values in the processing condition database 49 while displaying the thrust resistance on the display 42. Accordingly, the thrust resistance when the rotating speed and the feeding speed of the tool T have become appropriate values can be determined.

When the appropriate thrust resistance is determined, the appropriate thrust resistance is related with identification information on the tool T related with features of the tool T, identification information on the material, the appropriate rotating speed and feeding speed of the tool T, a delay time of about a few seconds after the tool T comes into contact with the material until the rotating speed and the feeding speed of the tool T each becomes appropriate, and other processing conditions, such as whether a prepared hole has been processed, which influence the thrust resistance, and then stored as hole processing conditions in the processing condition database 49.

Hole processing conditions can be set and stored by operation of the input device 40 through an operation screen, as exemplified by FIG. 12, which the processing condition setting part 44 displays on the display 42. Namely, the processing condition setting part 44 sets hole processing conditions based on information input from the input device 40, and then stores the set hole processing conditions in the processing condition database 49. When hole processing conditions have been set and stored, it becomes possible to perform hole processing of the workpiece W under the stored hole processing conditions.

When hole processing of the workpiece W is started, the tool driving device 1 is positioned and installed on the workpiece W. Specifically, the positioning bush 20 of the tool driving device 1 can be inserted into the positioning hole J1 of the drilling plate J2 fixed to the workpiece W, and then the flange-like part of the positioning bush 20 can be fixed to the drilling plate J2 with the setscrew J4, as exemplified by FIG. 8.

On the other hand, a starting position of an approach operation and a starting position of a retreat operation of the tool T shown in FIG. 13 are set together with a rotating speed and feeding speed at the time of the approach operation of the tool T through an operation screen displayed on the display 42. That is, the processing condition setting part 44 sets a starting position of an approach operation and a starting position of a retreat operation of the tool T as well as a rotating speed and feeding speed at the time of the approach operation of the tool T, as hole processing conditions corresponding to the workpiece W, based on information input from the input device 40, and then stores the set hole processing conditions in the processing condition database 49.

When a distance from an initial position of the tool T to the workpiece W is short, an approach operation may be performed from the initial position of the tool T without setting a starting position of the approach operation. In that case, a rotating speed and feeding speed at the time of the approach operation are set as initial values of the rotating speed and feeding speed of the tool T. When the tool T is advanced up to the maximum stroke of the tool driving device 1 before the tool T is retreated, setting of a starting position of a retreat operation can be omitted.

Then, once a user inputs information for instructing a start of hole processing from the input device 40 into the rotating/feeding speed control part 45, e.g., by pushing a start button on an operation screen, the rotating/feeding speed control part 45 controls the tool driving device 1 according to hole processing conditions stored in the processing condition database 49. Thereby, driving of the tool driving device 1 is started.

Specifically, the rotating/feeding speed control part 45 outputs control signals to the second electric motor 23 of the electric actuator 7 so that the tool T and the spindle 3 may move forward from the retreat position to the starting position of the approach operation by fast feeding. Accordingly, the second electric motor 23 rotates and thereby the ball screw 24 of the electric actuator 7 moves forward at a speed corresponding to the fast feeding.

Then, the sliding mechanism 33 coupled to the ball screw 24 slides, and eventually the pusher 25 fixed to the tip of the ball screw 24 is pressed on the load cell 32. Thereby, the moving plate 22 moves forward together with the reinforcing frame 30, to which the load cell 32 is attached, along the shafts 6C of the guide 6. As a result, the first electric motor 4 of which the housing 12 is fixed to the moving plate 22, the spindle 3 coupled to the first electric motor 4, the holder 2, and the tool T also move forward by fast feeding.

Next, the rotating/feeding speed control part 45 outputs control signals to the first electric motor 4 and the second electric motor 23 of the electric actuator 7 so that the tool T and the spindle 3 may approach the workpiece W from the starting position of the approach operation at the designated rotating speed and feeding speed. Accordingly, the output shaft 11 of the first electric motor 4 rotates and thereby the tool T and the holder 2 are rotated at the designated rotating speed together with the spindle 3 coupled to the output shaft 11 through the adapter 17. On the other hand, the second electric motor 23 slows down and thereby the advancing speed of the ball screw 24 to which the pusher 25 is attached becomes the designated feeding speed. As a result, the advancing speed of the first electric motor 4, the spindle 3, the holder 2, and the tool T also becomes the designated feeding speed.

When the tool T moves forward and then comes into contact the workpiece W, cutting is started and thereby the cutting resistance is applied from the workpiece W to the tool T. The Cutting resistance is transmitted from the tool T to the spindle 3 through the holder 2. The cutting torque included in the cutting resistance transmitted to the spindle 3 is transmitted from the spindle 3 to the output shaft 11 of the first electric motor 4 through the adapter 17.

On the other hand, the thrust resistance included in the cutting resistance transmitted to the spindle 3 is not transmitted to the output shaft 11, but is transmitted to the thrust bearing 16. This is because the clearance 19A for preventing the thrust resistance from being transmitted is formed between the end face of the output shaft 11 and the face perpendicular to the thrust direction formed on the flange 17A of the adapter 17 while the supporting face perpendicular to the thrust direction formed on the flange 17A of the adapter 17 is in contact with only the thrust bearing 16, as shown in FIG. 6. Thereby, it is possible to avoid a trouble that excess thrust resistance is applied to the output shaft 11 of the first electric motor 4 and thereby quality and accuracy of a hole deteriorate due to eccentricity of the output shaft 11.

Although the thrust resistance transmitted to the thrust bearing 16 is transmitted to the housing 12 of the first electric motor 4, the housing 12 is not deformed nor damaged since the area of the face perpendicular to the thrust direction of the thrust bearing 16 has been determined so that the housing 12 can withstand the thrust resistance.

The thrust resistance transmitted to the housing 12 is transmitted through the moving plate 22 and the reinforcing frame 30 to the load cell 32 pushed out by the force from the pusher 25 that opposes the thrust resistance. Thereby, the thrust resistance can be measured by the load cell 32.

Note that, also when thrust resistance is measured in advance using a test piece, the thrust resistance transmitted through the same route can be measured by the load cell 32. Before the pusher 25 is advanced, no force is applied from the pusher 25 to the load cell 32 and therefore no load is detected by the load cell 32. Accordingly, a load measured by the load cell 32 can be treated as the thrust resistance as it is.

The thrust resistance measured by the load cell 32 is output to the controller 8. The rotating/feeding speed control part 45 of the controller 8 constantly monitors a load measured by the load cell 32, and substantively specifies the material related with the thrust resistance output from the load cell 32 with reference to the processing condition database 49. Then, the first electric motor 4 and the second electric motor 23 are controlled by the rotating/feeding speed control part 45 so that hole processing of the workpiece W may be performed under the hole processing conditions related with the thrust resistance.

Specifically, control signals are output from the rotating/feeding speed control part 45 to the first electric motor 4 and the second electric motor 23 so that the tool T and the spindle 3 may rotate and move forward at the rotating speed and feeding speed set as the hole processing conditions after the delay time of about several seconds, designated as one of the hole processing conditions, from the first detection time of the thrust resistance by which the material was specified.

Accordingly, after the tool T comes into contact with the workpiece W and thereby the thrust resistance is detected, the rotating speed and feeding speed are safely accelerated or decelerated over a few seconds. As a result, the rotating speed and feeding speed of the tool T and the spindle 3 become the rotating speed and feeding speed appropriate for the material set as the hole processing conditions. Therefore, the value of the thrust resistance also becomes a value corresponding to the appropriate rotating speed and feeding speed. Thereby, hole processing of the workpiece W can be performed under satisfactory cutting conditions.

In case of the workpiece W made of laminated materials, the thrust resistance changes at timing when the tool T comes into contact with a material adjacent in the depth direction of the hole. When the changed thrust resistance is detected by the load cell 32 and then output to the controller 8, the rotating/feeding speed control part 45 substantially specifies the material related with the changed thrust resistance with reference to the processing condition database 49. Then, the first electric motor 4 and the second electric motor 23 are controlled by the rotating/feeding speed control part 45 according to the hole processing conditions related with the specified material. Thereby, hole processing of the adjacent material can also be performed at the appropriate rotating speed and feeding speed.

The thrust resistance record/output part 46 displays the thrust resistance measured by the load cell 32 on the display 42 in real time. In addition, the thrust resistance record/output part 46 stores the thrust resistance measured by the load cell 32 in the processing condition database 49. Accordingly, a user can check time change of the thrust resistance, and thereby grasp hole processing of which material is being performed. In addition, not only existence of an abnormality can be checked, but also whether cutting conditions were appropriate can be checked with reference to time change of the thrust resistance stored in the processing condition database 49 in a case where a defect was found afterward.

The abnormality detecting part 47 monitors whether the thrust resistance measured by the load cell 32 presents an abnormal value. When the abnormality detecting part 47 detects an abnormality of the thrust resistance, a user is notified of the abnormality through the display 42 or the like. Accordingly, even when a user overlooks an abnormality of the thrust resistance displayed on the display 42, a defect, such as wear or chipping, of the tool T can be detected.

When the tool T passes through the workpiece W, no thrust resistance arises. In this case, the load cell 32 detects only a load from the pusher 25 for advancing the tool T and the spindle 3. Accordingly, it is possible to set a hole processing condition that the rotating speed and feeding speed of the tool T and the spindle 3 are not changed in a case where a load measured by the load cell 32 decreases down to a negligible degree. Thereby, the tool T can be advanced up to the starting position of the retreat operation without changing the rotating speed and feeding speed.

When the rotating/feeding speed control part 45 detects that the tool T has reached the starting position of the retreat operation, based on a control amount of the electric actuator 7 including the second electric motor 23, the rotating/feeding speed control part 45 controls the first electric motor 4 and the second electric motor 23 so that the tool T may retreat from the starting position of the retreat operation to the retreat position by fast return. Accordingly, the pusher 25 is retreated together with the ball screw 24, and thereby the sliding mechanism 33 coupled to the ball screw 24 slides. As a result, the pusher 25 is pulled apart from the load cell 32, and thereby a load detected by the load cell 32 becomes zero.

When the ball screw 24 is further retreated, the sliding mechanism 33 slides to the maximum stroke position. Accordingly, the moving plate 22 is retreated together with the reinforcing frame 30 coupled to the sliding mechanism 33 along the shafts 6C of the guide 6. As a result, the first electric motor 4 of which the housing 12 is fixed to the moving plate 22, the spindle 3 coupled to the first electric motor 4, the holder 2, and the tool T are retreated by fast return.

When the ball screw 24 has been retreated to the retreat position, the ball screw 24 is stopped by electronic control of the second electric motor 23. On the other hand, the first electric motor 4 of which the housing 12 is fixed to the moving plate 22, the spindle 3 coupled to the first electric motor 4, the holder 2, and the tool T are physically stopped since one of the sliders 21 attached to the moving plate 22 comes into contact with the stopper 35. Thereby, the clearance arises between the pusher 25 and the load cell 32 attached to the moving plate 22 through the reinforcing frame 30. Consequently, it can be avoided that a load is detected by the load cell 32 before advancing.

When hole processing of the workpiece W is completed, a hole processed product is obtained as a finished product or a partially-finished product. This hole processed product is of high quality since not only the hole processed product has been processed by the tool T rotated by torque given from the output shaft 11 of the first electric motor 4 of which the eccentricity of the central axis has been suppressed by disposing the thrust bearing 16, but also the hole processed product has been processed by the tool T rotated and fed at the appropriate rotating speed and feeding speed based on the thrust resistance measured by the load cell 32.

Effects

In the above-mentioned tool driving device 1 and method of producing a hole processed product, the thrust bearing 16 is disposed between the spindle 3 and the first electric motor 4 for rotating the tool T and the spindle 3. Specifically, the adapter 17 having the flange 17A is fixed to the rear end portion of the spindle 3, and then the thrust bearing 16 is disposed between the flange 17A of the adapter 17 and the housing 12 of the first electric motor 4.

Thus, according to the tool driving device 1 and the method of producing a hole processed product, the upper limit of the thrust resistance can be dramatically increased in case of hole processing by coaxially disposing the output shaft 11 of the first electric motor 4 and the spindle 3. For example, even the coreless motor 10, which has conventionally been considered unsuitable for rotating the spindle 3 receiving the cutting resistance from the cutting tool T due to its insufficient output, can withstand the cutting torque by the built-in gears 9, and meanwhile withstand the thrust resistance by disposing the thrust bearing 16.

As a result, it becomes possible to set the rotating speed and feed speed of the tool T more appropriately. That is, it becomes possible to set cutting conditions which cause larger thrust resistance. Accordingly, not only it becomes possible to set cutting conditions causing greatly different thrust resistance for each material, as mentioned above, but also a material can be specified based on a measured value of the thrust resistance by relating the material to the thrust resistance, and then the rotating speed and feed speed of the tool T can be automatically set according to the specified material. On the other hand, deflection and eccentricity of the spindle 3 can be reduced, and therefore it becomes possible to produce a higher quality hole processed product.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, the tool driving device 1 may be provided with a function to supply cutting fluid, such as lubricating oil or coolant, or a function to flow air for dust collection or air cooling. The cutting fluid may be sprayed in the form of mist. In that case, an adapter may be attached to the holder 2 for coupling a hose that forms a flow path for the cutting fluid or the air.

Further, the coreless motor 10 provided with the thrust bearing 16 to withstand the thrust resistance and the first electric motor 4 having a core can also be used for processing other than hole processing. Accordingly, although a case where the tool driving device 1 is for hole processing has been described as an example in the above-mentioned implementation, the tool driving device may be a device for milling or the like that a user carries by hand and use.

In that case, what is necessary is just to add at least one necessary driving shaft to the electric actuator 7 so that the spindle 3 and the first electric motor 4 can be moved relatively to the guide 6 in at least one direction perpendicular to the rotation axis direction of the spindle 3 in addition to the rotation axis direction of the spindle 3, e.g., in orthogonal three-axis directions. As a matter of course, a rotating shaft may be added to the electric actuator 7 so that the rotating direction and feeding direction of the spindle 3 can be tilted.

In that case, a machined product can be produced by holding the tool T, such as an end mill, for cutting of the workpiece W with the holder 2, and the cutting of the workpiece W. The machined product produced as mentioned above is of high quality since the machined product has been processed by the tool T rotated by torque given from the output shaft 11 of the first electric motor 4 of which the eccentricity of the central axis has been suppressed by disposing the thrust bearing 16.

Moreover, although a case of using the load cell 32 for measuring the thrust resistance as the sensor 31 for measuring the cutting resistance has been described in the above-mentioned implementation, a torque sensor for measuring the cutting torque may be used instead of load cell 32 or in addition to load cell 32. A torque sensor can be coupled to a rotated portion integrated with the spindle 3 at a desired position.

In case of using only a torque sensor instead of the load cell 32, the rotating speed and feeding speed of the spindle 3 can be automatically set by simple data processing based on only a single parameter consisting of the cutting torque, similarly to a case of automatically setting the rotating speed and feeding speed of the spindle 3 based on only the thrust resistance. Nevertheless, measuring the thrust resistance with the load cell 32 allows further simplifying data processing in the controller 8 since it is possible to apply no load on the load cell 32 mechanically using the sliding mechanism 33 at the time of retreat of the spindle 3 as mentioned above.

What is claimed is:

1. A tool driving device for cutting, the tool driving device being configured to be carried by hand, the tool driving device comprising:

a spindle having a holder for holding a tool for the cutting, the holder being disposed at a distal portion of the spindle; and an electric motor for rotating the spindle, wherein a thrust bearing is attached to a housing of the electric motor, the spindle being contacted to the thrust bearing so that cutting resistance in a rotation axis direction of the spindle, transmitted from the tool to the spindle, is applied to the thrust bearing, further comprising:

an annular pedestal disposed between the thrust bearing and the housing of the electric motor in the rotation axis direction of the spindle, the annular pedestal being disposed outside an output shaft of the electric motor, projected from the housing, at least a part of a thrust washer, on a spindle side, of the thrust bearing being projected, toward the spindle side, from an end face, on the spindle side, of the output shaft, by disposing the annular pedestal; and an adapter coupled to an end portion, on an electric motor side, of the spindle, the adapter having an annular flange contacted to the thrust washer, the annular flange being fixed to the output shaft and a gap being formed between the annular flange and the end face of the output shaft so that torque is transmitted from the output shaft to the spindle while the cutting resistance is transmitted from the spindle to the housing through the thrust bearing and the annular pedestal.

2. The tool driving device according to claim 1, wherein a coreless motor is used as the electric motor, gears being disposed inside the housing of the coreless motor, the spindle being coupled to the coreless motor with coupling no gear head to the coreless motor, the thrust bearing being disposed between the coreless motor and the spindle.

3. The tool driving device according to claim 2, further comprising:

a guide having a positioning member for positioning the tool driving device to a workpiece, the positioning member including at least one of a positioning bush, a concentric collet and a fixing tool;

a reinforcing frame fixed to the housing of the electric motor;

an electric actuator for moving the reinforcing frame relatively to the guide;

a load cell for measuring the cutting resistance transmitted from the spindle to the housing through the thrust bearing and further transmitted from the housing to the reinforcing frame, the load cell being attached to the reinforcing frame; and a controller configured to control the electric motor and the electric actuator based on the cutting resistance measured by the load cell so that a rotating speed and a feeding speed of the spindle become a rotating speed and a feeding speed according to the cutting resistance.

4. A method of producing a machined product comprising:

producing the machined product by cutting the workpiece using the tool driving device according to claim 3.

5. A method of producing a machined product comprising:

producing the machined product by cutting a workpiece using the tool driving device according to claim 2.

6. A method of producing a machined product comprising:

producing the machined product by cutting a workpiece using the tool driving device according to claim 1.

7. A tool driving device for cutting, the tool driving device being configured to be carried by hand, the tool driving device comprising:

a spindle having a holder for holding a tool for the cutting, the holder being disposed at a distal portion of the spindle; and an electric motor for rotating the spindle, wherein a thrust bearing is attached to a housing of the electric motor, the spindle being contacted to the thrust bearing so that cutting resistance in a rotation axis direction of the spindle, transmitted from the tool to the spindle, is applied to the thrust bearing, further comprising:

a guide having a positioning member for positioning the tool driving device to a workpiece, the positioning member including at least one of a positioning bush, a concentric collet and a fixing tool;

a reinforcing frame fixed to the housing of the electric motor;

an electric actuator for moving the reinforcing frame relatively to the guide;

a load cell for measuring the cutting resistance transmitted from the spindle to the housing through the thrust bearing and further transmitted from the housing to the reinforcing frame, the load cell being attached to the reinforcing frame; and a controller configured to control the electric motor and the electric actuator based on the cutting resistance measured by the load cell so that a rotating speed and a feeding speed of the spindle become a rotating speed and a feeding speed according to the cutting resistance.

8. A method of producing a machined product comprising:

producing the machined product by cutting the workpiece using the tool driving device according to claim 7.

* * * * *